United States Patent
Bunandar et al.

(10) Patent No.: US 10,158,481 B2
(45) Date of Patent: Dec. 18, 2018

(54) APPARATUS AND METHODS FOR QUANTUM KEY DISTRIBUTION

(71) Applicant: Massachusetts Institute of Technology, Cambridge, MA (US)

(72) Inventors: Darius Bunandar, Cambridge, MA (US); Nicholas C. Harris, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 160 days.

(21) Appl. No.: 15/179,583

(22) Filed: Jun. 10, 2016

(65) Prior Publication Data

US 2016/0352515 A1   Dec. 1, 2016

Related U.S. Application Data

(63) Continuation of application No. PCT/US2016/034639, filed on May 27, 2016.
(Continued)

(51) Int. Cl.
*H04L 9/08*  (2006.01)
*H04B 10/70*  (2013.01)
(Continued)

(52) U.S. Cl.
CPC ........ *H04L 9/0852* (2013.01); *H04B 10/0795* (2013.01); *H04B 10/25* (2013.01); *H04B 10/70* (2013.01); *H04L 2209/12* (2013.01)

(58) Field of Classification Search
USPC ....................................................... 380/278
See application file for complete search history.

(56) References Cited

U.S. PATENT DOCUMENTS 4,720,160 A * 1/1988 Hicks, Jr. ................ G02B 6/02
                                                        359/891
7,324,647 B1   1/2008 Elliott
(Continued)

FOREIGN PATENT DOCUMENTS

WO   WO 2010/003998 A1   1/2010
WO   WO 2013/112351 A2   8/2013

OTHER PUBLICATIONS

Azuma et al. "All-photonic quantum repeaters," Nature Communications, Article, Apr. 15, 2015, 7 pages.
(Continued)

*Primary Examiner* — Jeffrey C Pwu
*Assistant Examiner* — Samuel Ambaye
(74) *Attorney, Agent, or Firm* — Smith Baluch LLP

(57) ABSTRACT

Systems, apparatus, and methods using an integrated photonic chip capable of operating at rates higher than a Gigahertz for quantum key distribution are disclosed. The system includes two identical transmitter chips and one receiver chip. The transmitter chips encode photonic qubits by modulating phase-randomized attenuated laser light within two early or late time-bins. Each transmitter chip can produce a single-photon pulse either in one of the two time-bins or as a superposition of the two time-bins with or without any phase difference. The pulse modulation is achieved using ring resonators, and the phase difference between the two time-bins is obtained using thermo-optic phase shifters and/or time delay elements. The receiver chip employs either homodyne detection or heterodyne detection to perform Bell measurements.

20 Claims, 17 Drawing Sheets

Related U.S. Application Data

(60) Provisional application No. 62/167,515, filed on May 28, 2015.

(51) Int. Cl.
   H04B 10/079 (2013.01)
   H04B 10/25 (2013.01)

(56) References Cited

U.S. PATENT DOCUMENTS

| | | | |
|---|---|---|---|
| 7,403,623 B2 | 7/2008 | Cerf et al. | |
| 7,729,616 B2 | 6/2010 | Etemad et al. | |
| 7,929,700 B2 | 4/2011 | Lodewyck et al. | |
| 2003/0231826 A1* | 12/2003 | Boyd | G02B 6/12004 385/27 |
| 2004/0109564 A1 | 6/2004 | Cerf et al. | |
| 2007/0071244 A1* | 3/2007 | LaGasse | H04B 10/70 380/278 |
| 2013/0036145 A1* | 2/2013 | Pruneri | G06F 7/588 708/191 |
| 2014/0153720 A1 | 6/2014 | Jezewski et al. | |
| 2015/0077821 A1 | 3/2015 | Smith et al. | |
| 2016/0234017 A1* | 8/2016 | Englund | H04B 10/70 |

OTHER PUBLICATIONS

Bennett et al. "Quatum Cryptography: Plublic Key Distrubution and Coin Tossing," In Proceedings of IEEE, International Conference on Computers, Systems, and Signal Processing, pp. 175-179. IEEE, New York, 1984.
Bonanome et al. "Toward protocols for quantum-ensured privacy and secure voting," Physical Review A, 84(2):022331, 2011.
Browne, D.E. "Resource-efficient linear optical quantum computation," Physical Review Letters, 95(1):010501, Jun. 2005.
Bunandar et al. "Practical high dimensional quantum key distribution with decoy states," Physical Review A, 91(2):022336, 2015.
Christandl et al. "Quantum anonymous transmissions," in ASI-ACRYPT, pp. 217-235. Springer, 2005.
Collins et al. "Realization of quantum digital signatures without the requirement of quantum memory," Phys. Rev. Lett., 113:040502, Jul. 2014.
Curty, M. et al. "Finite-key analysis for measurement-device—independent quantum key distribution", Nature Communications, Article, Apr. 29, 2014, 7 pages.
Englund, D., et al. "Controlling cavity reectivity with a single quantum dot," Nature, 450(6):857-61, 2007.
Englund, D., et al. "Ultrafast photon-photon interaction in a strongly coupled quantum dot-cavity system," Phys. Rev. Lett., 108:093604, Mar. 2012.
Faraon, A., et al. "Coherent generation of nonclassical light on a chip via photon-induced tunneling and blockade," Nature Physics, 4:859-863, 2008.
Fushman, I., et al. "Controlled phase shifts with a single quantum", Dot. Science, 320(5877):769-772, 2008.
Guha, S., et al. "Quantum enigma machines and the locking capacity of a quantum channel," Phys. Rev. X, 4:011016, Jan. 2014.
Harris, N.C., et al."Integrated source of spectrally filtered correlated photons for large-scale quantum photonic systems," Phys. Rev. X, 4:041047, Dec. 2014.
Heck, M., et al. "Ultra-low loss waveguide platform and its integration with silicon photonics," Laser & Photonics Reviews, 8(5):667-686, 2014.
Heuck, M., et al. "On-demand single photon emission based on dynamic photon storage on a photonic integrated circuit," CLEO Europe, 2015.
Hu, X. et al., "Nonlocal cancellation of multi-frequency channel dispersion," Phys. Rev. A, 91:013809, Jan. 2015.
Jouguet, P., et al. "Experimental demonstration of long-distance continuous-variable quantum key distribution," Nature Photonics, 7(5):378-381, 2013.

Knill, E., et al. "A scheme for efficient quantum computation with linear optics," Nature, 409:4652, 2001.
Korzh, B., et al. "Provably secure and practical quantum key distribution over 307 km of optical fibre," Nature Photonics, Feb. 9, 2015, 6 pages.
Korzh, B., et al. "A high-speed multi-protocol quantum key distribution transmitter based on a dual-drive modulator," Optical Society of America, vol. 21, Issue 17, pp. 19579-19592 (2013).
Lahini, Y., et al. "Quantum Logic with Interacting Bosons in 1D," arXiv preprint arXiv:1501.04349, Mar. 2015, 8 pages.
Lee, C., et al. "High-dimensional time-energy entanglement-based quantum key distribution using dispersive optics." CLEO 2014, 2 pages.
Lee, C., et al. "Entanglement-based quantum communication secured by nonlocal dispersion cancellation," Phys. Rev. A, 90:062331, Dec. 2014.
Liu, Y., et al. "Experimental measurement-device—independent quantum key distribution," Phys. Rev. Lett., 111:130502, Sep. 2013.
Lo, H.-K., et al. "Measurement-device—independent quantum key distribution," Phys. Rev. Lett. 108, 130503, 2012.
Lo, H.-K., et al. "Secure quantum key distribution," Nat. Photon, 8(8):595-604, 08 2014.
Lo, H-K, et al., "Decoy state quantum key distribution," Physical review letters, 94(23):230504, 2005.
Lupo, C., et al. "Quantum-locked key distribution at nearly the classical capacity rate," Physical Review Letters, 113(16):160502, 2014.
Marris-Morini et al. "Integrated quantum cryptography circuit on silicon (CrypSil)," NanoSaclay Projet Emergence/Plateforme 2014, 13 pages, Jun. 30, 2015.
McCusker, K.T. "Efficient optical quantum state engineering," Phys. Rev. Lett., 103:163602, Oct. 2009.
Moss, D.J., et al. "New cmos compatible platforms based on silicon nitride and hydex for nonlinear optics," Nature Photonics, 7(8):597-607, 2013.
Mower, J., et al. "Efficient generation of single and entangled photons on a silicon photonic integrated chip," Phys. Rev. A, 84:052326, Nov. 2011.
Mower, J., et al. "High-dimensional quantum key distribution using dispersive optics," Phys. Rev. A, 87:062322, Jun. 2013.
Mower et al. "High-fidelity quantum photonics on a programmable integrated circuit.," ArXiv:1406.3255v2; Jun. 30, 2014, 8 pages.
Muralidharan et al. "Ultrafast and fault-tolerant quantum communication across long distances." Phys. Rev. Lett., 112:250501, Jun. 2014.
Najafi et al. "On-chip detection of non-classical light by scalable integration of single-photon," Nature Communications, Jan. 9, 2015, 8 pages.
Patel, K.A., et al. Quantum key distribution for 10 gb/s dense wavelength division multiplexing networks. Applied Physics Letters, 104(5), 2014.
Pirandola, S. et al. "The ultimate rate of quantum communications," ArXiv e-prints, Oct. 2015.
Pirandola, S., et al. "High-rate measurement-device-independent quantum cryptography," Nature Photonics, vol. 9, pp. 397-403, May 2015.
Rubenok, A., et al. "Real-world two-photon interference and proof-of-principle quantum key distribution immune to detector attacks," Phys. Rev. Lett. 111, 130501 2013.
Sangouard, N., et al. "Quantum repeaters based on atomic ensembles and linear optics," Rev. Mod. Phys., 83:33{80, Mar. 2011.
Scarani, V., et al. "The security of practical quantum key distribution," Rev. Mod. Phys., 81:1301-1350, Sep. 2009.
Shapiro, J.H., et al. "Secure communication via quantum illumination," Quantum Information Processing, 13(10):2171-2193, 2014.
Sibson, P., et al. "Integrated Photonic Devices for Quantum Key Distribution," CLEO, OSA Technical Digest, 2015, 2 pages.
Soref, R. "Silicon photonics: a review of recent literature," Silicon, Guest Editorial, 2(1):1-6, 2010.
Stebila, D. et al. "The case for quantum key distribution," In Alexander V. Sergienko, Saverio Pascazio, and Paolo Villoresi, editors, Quantum-Comm, vol. 36 of Lecture Notes of the Institute

(56) References Cited

OTHER PUBLICATIONS for Computer Sciences, Social Informatics and Telecommunications Engineering, pp. 283-296. Springer, 2009.

Su et al., "Four-port integrated polarizing beam splitter," Opt. Lett. vol. 39, No. 4, pp. 965-968 (Feb. 15, 2014).

Takeoka, M., et al. Fundamental rate-loss tradeoff for optical quantum key distribution. Nat. Commun., 5, 10 2014.

Tang, Y-L, et al. "Measurement device—independent quantum key distribution over 200 km.," Phys. Rev. Lett., 113:190501, Nov. 2014.

Tang, Z., et al. "Experimental Demonstration of Polarization Encoding Measurement-Device—Independent Quantum Key Distribution," Phys. Rev. Lett. 112, 190503, 2014.

Valivarthi, R. "Measurement-device—independent quantum key distribution: from idea towards application," Journal of Modern Optics, 62(14):1141-1150, Mar. 26, 2015.

Vest, G., et al. "Design and evaluation of a handheld quantum key distribution sender module," IEEE Journal of Quantum Electronics, 2014.

Xiao, L. "Efficient multiparty quantum-secretsharing schemes," Physical Review A, 69(5):052307, 2004.

Xu et al., "Electrically tunable optical polarization rotation on a silicon chip using Berry's phase," Nature Communications 5:5337 (Nov. 2014).

Xu, F., et al. "Measurement-device—independent quantum cryptography," IEEE Journal of Selected Topics in Quantum Electronics, 21(3):1-11, 2015.

Zhang, Z., et al. "Unconditional security of time-energy entanglement quantum key distribution using dual-basis interferometry," Phys. Rev. Lett., 112:120506, Mar. 2014.

Zhao, Y., et al. "Quantum hacking: Experimental demonstration of time-shift attack against practical quantum-key-distribution systems," Phys. Rev. A, 78:042333, Oct. 2008.

Zhong, T., et al. "Photon-efficient quantum key distribution using time{energy entanglement with high-dimensional encoding," New Journal of Physics, 17(2):022002, May/Jun. 2015.

International Search Report and Written Opinion of the International Searching Authority regading Inernational Application No. PCT/US16/34639, dated Oct. 4, 2016, 14 pages.

\* cited by examiner

APPARATUS AND METHODS FOR QUANTUM KEY DISTRIBUTION

CROSS-REFERENCES TO RELATED APPLICATIONS

This application is a bypass continuation application of International Application No. PCT/US2016/034639, filed May 27, 2016, and entitled "Apparatus and Methods for Quantum Key Distribution," which claims the priority benefit of U.S. Application No. 62/167,515, filed May 28, 2015, and entitled "MEASUREMENT-DEVICE-INDEPENDENT QUANTUM KEY DISTRIBUTION BASED ON PHOTONIC INTEGRATED CIRCUITS." Each of these applications is hereby incorporated herein by reference in its entirety.

BACKGROUND

Measurement-device-independent quantum key distribution (MDI-QKD) is a method of distributing secret keys that can be immune to detector side channel attacks. The scheme includes at least two sending chips (usually referred to as Alice and Bob), which encode signals in single photons through either time-bin encoding or polarization encoding, as well as a receiver chip (usually referred to as Charlie), which measures the signals in the maximally-entangled Bell basis.

To implement the MDI-QKD protocol, Alice and Bob randomly and independently prepare photon signals in one of the four BB84 states: $|0\rangle$, $|1\rangle$ in the Z-basis, or $|+\rangle$, $|-\rangle$ in the X-basis. These photons are then sent via the quantum channel to Charlie who is instructed to perform a Bell state measurement. The four Bell states are summarized in Table 1. Alice and Bob can also apply the decoy state protocol to their photon signals to estimate the gain (i.e., the probability that Alice and Bob's signals yield a successful Bell measurement) and the quantum bit error rate (QBER, the rate of false successful Bell measurements due to single photon contributions).

Charlie announces whether or not his Bell state measurements are successful along with the Bell state obtained. Alice and Bob retain only the data that correspond to successful Bell state measurements and discard the rest. For the data they retained, Alice and Bob each reveal their basis choices over the public channel and retain only those instances where they chose the same basis. Bob then flips parts of his data to directly correlate his measurements with those of Alice. Finally, Alice and Bob apply error correction and privacy amplification to establish identical secret keys.

TABLE 1

The four Bell states and possible bit flips
to directly correlate Alice and Bob's bits

| Basis chosen by Alice and Bob | Bell state reported by Charlie | | | |
|---|---|---|---|---|
| | $\|\psi^-\rangle =$ $(\|01\rangle -$ $\|10\rangle)/\sqrt{2}$ | $\|\psi^+\rangle =$ $(\|01\rangle +$ $\|10\rangle)/\sqrt{2}$ | $\|\varphi^-\rangle =$ $(\|00\rangle -$ $\|11\rangle)/\sqrt{2}$ | $\|\varphi^+\rangle =$ $(\|00\rangle +$ $\|11\rangle)/\sqrt{2}$ |
| Z basis | Flip | Flip | — | — |
| X basis | Flip | — | Flip | — |

The rate of secret key generation (in bits per second, per Bell state), in the limit of large number of signals exchanged for each Bell state $|k\rangle \varepsilon \{|\varphi^+\rangle, |\varphi^-\rangle, |\psi^+\rangle, |\psi^-\rangle\}$ is $$R_{|k\rangle} \geq r \left\{ Q_{z,|k\rangle}^{1,1}\left[1 - H_2\left(e_{x,|k\rangle}^{1,1}\right)\right] - Q_{z,|k\rangle}^{vsa,vsb} fe\left(E_{z,|k\rangle}^{vsa,vsb}\right)\left(H_2\frac{vsa,vsb}{z,|k\rangle}\right)\right\} \quad (1)$$

where r is the repetition rate in Hz $$Q_{z,|k\rangle}^{1,1} \text{ and } \frac{1,1}{x,|k\rangle}$$

are the gain and QBER due to single photon signals;

$$Q_{z,|k\rangle}^{vsa,vsb} \text{ and } e_{x,|k\rangle}^{1,1}$$

are the gain and QBER for signals emitted by Alice and Bob with mean photon number $V_{sa}$ and $V_{sb}$, respectively; $fe \geq 1$ is the error correction inefficiency; $H_2(x) = -x \log_2 x - (1-x)\log_2(1-x)$ is the binary entropy function. The equation for the secret key generation rate assumes that Alice and Bob use the Z-basis for key generation and only use the X-basis for security checks. The quantities $$Q_{z,|k\rangle}^{vsa,vsb} \text{ and } E_{z,|k\rangle}^{vsa,vsb}$$

can be measured directly as the MDI-QKD system is run, while the quantities $$Q_{z,|k\rangle}^{1,1} \text{ and } e_{x,|k\rangle}^{1,1}$$

can be measured using the decoy-state protocol.

A more detailed description of the protocol with two decoy states is as follows. The protocol can be performed with more than two decoy states, but in practice it can be desirable to have as few decoy states as possible. The first four steps of the protocol—state preparation, state distribution, Bell state measurement, and sifting—are repeated N times until the successful sifting conditions are met.

Step 1: State preparation. Alice and Bob randomly and independently choose an intensity for their photon signals: $V_a \in \{V_{sa}, V_{da,1}, V_{da,2}\}$ for Alice and $V_b \in \{V_{sb}, V_{db,1}, V_{db,2}\}$ for Bob. $V_{sa}(V_{sb})$ corresponds to the intensity of the signal state for Alice (Bob) and $V_{da,i}$ ($V_{db,i}$) for 1,2 corresponds to the intensity of the decoy states for Alice (Bob). The two decoy states typically have weaker intensities than the signal state. Alice and Bob then randomly and independently choose a basis $B_i \in \{Z,X\}$, and a bit $r_i \in \{0,1\}$ with probability of $P_{vi,ri}/2$ for i=a (Alice) or b (Bob). They then prepare a quantum signal of intensity $v_i$ encoding qubit $|r_i\rangle$ in basis $B_i$ for both i=a or b.

Step 2: State distribution. Alice and Bob send their prepared quantum signals to Charlie via the quantum channel.

Step 3: Bell state measurement. If Charlie is not an adversary to Alice and Bob, he then measures the quantum signals received in the maximally-entangled Bell basis.

Charlie then announces whether or not his measurement is successful, including the Bell state obtained.

Step 4: Sifting. If Charlie announces a successful Bell measurement, Alice and Bob then announce their intensity and basis choices. For each Bell state $|k\rangle \in \{|\varphi^+\rangle, |\varphi^-\rangle, |\psi^+\rangle, |\psi^-\rangle\}$, Alice and Bob bin their data in $$Z\frac{va, vb}{|k\rangle} \text{ and } X\frac{va, vb}{|k\rangle}$$

according to their intensity and basis choices. The first four steps of the protocol are repeated until $$\left|Z\frac{va, vb}{|k\rangle}\right| \geq N\frac{va, vb}{|k\rangle} \text{ and } \left|X\frac{va, vb}{|k\rangle}\right| \geq M\frac{va, vb}{|k\rangle},$$

where $$N\frac{va, vb}{|k\rangle} \text{ and } M\frac{va, vb}{|k\rangle}$$

are chosen such that large enough statistical samples for the post-processing steps are available. Bob then corrects his data by flipping parts of his bits according to Table 1 so that his data are directly correlated with Alice's data.

Step 5: Post-processing. Post-processing is performed independently for each Bell state $|k\rangle \in \{|\varphi^+\rangle, |\varphi^-\rangle, |\psi^+\rangle, |\psi^-\rangle\}$. This step can include several sub-steps, including:

Step 5a: Parameter estimation. Alice and Bob choose a random subset of $$Z\frac{vsa, vsb}{|k\rangle}$$

and store the respective bit strings $Z_{|k\rangle}$ and $Z_{|k\rangle}'$, respectively. They then use the remaining bits $R_{|k\rangle}$ of $$Z\frac{vsa, vsb}{|k\rangle}$$

to compute the QBERs $$E\frac{vsa, vsb}{|k\rangle} = \frac{1}{|R|k\rangle|}\Sigma_l r_l \oplus r_l',$$

where $r_l'$ are Bob's bits. If $$E\frac{vsa, vsb}{|k\rangle}$$

is higher than the QBER tolerance, Alice and Bob then abort any subsequent steps for this particular $|k\rangle$. The whole protocol only aborts if $$E\frac{vsa, vsb}{|k\rangle}$$

is higher than the allowed QBER tolerance for all four choices of $|k\rangle$. If $$E\frac{vsa, vsb}{|k\rangle}$$

is within the allowed QBER tolerance, then Alice and Bob use $$Z\frac{vsa, vsb}{|k\rangle} \text{ and } X\frac{vsa, vsb}{|k\rangle}$$

to estimate the values of $$Q\frac{1, 1}{z, |k\rangle}, e\frac{1, 1}{x, |k\rangle} \text{ and } Q\frac{vsa, vsb}{z, |k\rangle}$$

for this particular $|k\rangle$).

Step 5b: Error correction. If this particular $|k\rangle$ passes the parameter estimation step, Bob obtains an estimate $\hat{Z}_{|k\rangle}$ of $Z_{|k\rangle}$ using an information reconciliation scheme, which requires Alice to leak some information of $Z_{|k\rangle}$. Alice then computes a hash of $Z_{|k\rangle}$ using a random universal hash function, which is sent to Bob along with the value of the hash. Bob then computes the hash of $\hat{Z}_{|k\rangle}$ and aborts the protocol for this particular $|k\rangle$ if the hash of $\hat{Z}_{|k\rangle}$ disagrees with the hash of $Z_{|k\rangle}$.

Step 5c: Privacy amplification. If this particular $|k\rangle$ passes the error correction step, Alice and Bob apply another random universal$_2$ hash function to $Z_{|k\rangle}$ and $\hat{Z}_{|k\rangle}$ to obtain the (shared) secret key, respectively.

Currently, the above MDI-QKD protocol is implemented with bulk optical components. One drawback of bulk optical systems is that they usually use manual assembly of many parts (e.g., mirrors, phase modulators, lenses, etc.). It can also be challenging to make bulk optical systems mechanically stable to guard against component misalignment due to vibration and temperature variations.

SUMMARY

Embodiments of the present invention include apparatus, systems, and methods for quantum key distribution. In one example, an apparatus for distributing a quantum key includes an input waveguide, a first ring resonator, a second ring resonator, and an output waveguide. The first ring resonator is evanescently coupled to the input waveguide to receive a first pulse of light via the input waveguide. The second ring resonator is evanescently coupled to the input waveguide to receive a second pulse of light via the input waveguide. The output waveguide is evanescently coupled to the first ring resonator and the second ring resonator to receive the first pulse of light from the first ring resonator and the second pulse of light from the second ring resonator. The apparatus also includes at least one modulator, operably coupled to at least one of the first ring resonator, the second ring resonator, and the output waveguide, to delay at least one of the first pulse of light or the second pulse of light so as to generate a photonic qubit in an X-basis or a Z-basis In another example, a method of distributing a quantum key is disclosed. The method uses a transmitter including an input waveguide, a first ring resonator evanescently coupled to the input waveguide, a second ring resonator evanescently coupled to the input waveguide, and an output waveguide evanescently coupled to the first ring resonator and the second ring resonator. The method includes selecting one of an X-basis and a Z-basis for distributing the quantum key. In response to selection of the Z-basis, at least one of the following two steps is performed: delaying a first pulse of light propagating in the first ring resonator to create the quantum key in a |0⟩ state in the Z-basis; or delaying the first pulse of light propagating in the first ring resonator to create the quantum key in a |1⟩ state in the Z-basis. In response to selection of the X-basis, at least one of the following two steps is performed: delaying the first pulse of light propagating in the first ring resonator with respect to a second pulse of light propagating in the second ring resonator to constructively interfere the first pulse of light with the second pulse of light so as to create the quantum key in an |+⟩ state in the Z-basis, or delaying the first pulse of light propagating in the first ring resonator with respect to the second pulse of light propagating in the second ring resonator to destructively interfere the first pulse of light with the second pulse of light so as to create the quantum key in an |−⟩ state in the Z-basis.

In yet another example, an apparatus for measurement-device-independent quantum key distribution includes an input waveguide to guide an input pulse of light and an output waveguide to deliver quantum keys. The output waveguide includes a receiving section, evanescently coupled to the input waveguide, to receive the input pulse of light, a propagation section to guide the input pulse of light received by the input section, and a loop section having at least one segment evanescently coupled to the propagation section so as to couple at least a portion of the input pulse of light back to the propagation section. The apparatus also includes a first ring resonator evanescently coupled to the propagation section of the output waveguide and a first modulator, operably coupled to the first ring resonator, to delay a first pulse of light propagating in the first ring resonator. The apparatus further includes a second ring resonator evanescently coupled to the propagation section of the output waveguide and a second modulator operably coupled to the second ring resonator and having a first modulation mode and a second modulation mode. In the first modulation mode, the second modulator delays a second pulse of light propagating in the second ring resonator so as to cause the first pulse of light to constructively interfere with the second pulse of light. In the second modulation mode, the second modulator delays the second pulse of light so as to cause the first pulse of light to destructively interfere with the second pulse of light.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1A:
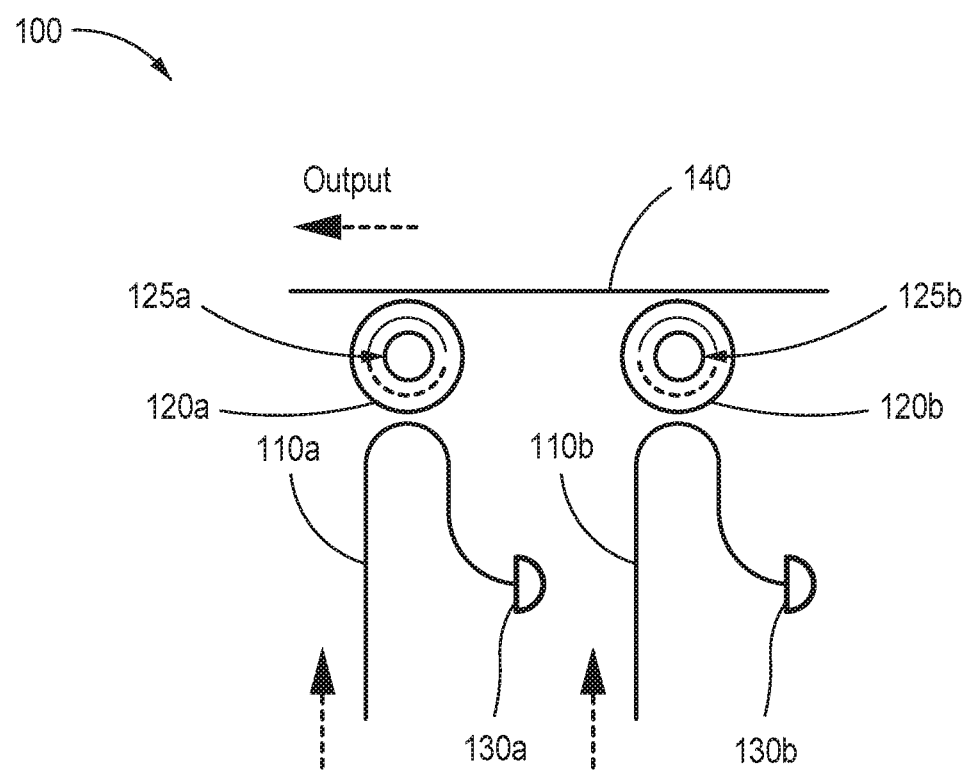
FIG. 1A shows a schematic of a photonic integrated transmitter including ring resonators for quantum key distribution.

To address the drawbacks of bulk optical systems in implementing QKD protocols, systems, apparatus, and methods described herein employ a compact approach using an integrated photonic chip that is capable of operating at rates higher than a Gigahertz. The compact MDI-QKD system is based on photonic integrated circuits (PICs). The system includes three different chips: two identical transmitter chips and one receiver chip. Each of the two parties (Alice and Bob) who are interested in generating shared secret keys operates a single transmitter chip. An untrusted party (Charlie) operates the receiver chip that measures the photonic quantum information signals (quantum bits, or qubits) generated by the two transmitter chips.

In the time-bin encoding scheme, the transmitter chips encode photonic qubits by modulating phase-randomized attenuated laser light within two early or late time-bins. Each transmitter chip can produce a single-photon pulse either in one of the two time-bins or as a superposition of the two time-bins with or without any phase difference. The pulse modulation is achieved using ring resonators, and the phase difference between the two time-bins is obtained using thermo-optic phase shifters and/or time delay elements.

In the polarization encoding scheme, the transmitter chips encode information in the polarization of the phase-randomized attenuated laser light. The chips generate light pulses polarized horizontally, vertically, along +45°, or along −45°. Similar to the time-bin encoding scheme, pulse modulation is provided by ring resonators. Polarization control is obtained by using on-chip polarizing beam splitters or by using polarization rotators based on Berry's phase.

The transmitter chips described herein can generate arbitrary single photonic qubit state. Therefore, these transmitter chips can also be used in other quantum cryptography protocols that involve preparing and sending photonic qubit states, e.g. the BB84 protocol, the coherent-one-way protocol, etc.

When the two photonic qubits arrive at the untrusted party, the receiver chip measures the two qubits in the maximally entangled Bell basis. For the time-bin encoding, The Bell basis measurement is performed by mixing the two qubits using a 50:50 beam splitter and then detecting the output signals using two single photon detectors. For polarization encoding, the Bell measurement is achieved by mixing the two qubits using a 50:50 beam splitter followed by a polarizing beam splitter in each of the output ports and then detecting the output signals using four single photon detectors. Suitable on-chip single photon detectors include superconducting nanowire single-photon detectors.

The use of PIC in QKD systems offers several important advantages over the traditional bulk optic implementations. First, chip-level integration of all optical components allows miniaturization and economical production of QKD systems. Second, chip-level integration can also augment traditional CMOS microprocessors and other microchips with unconditionally secure communication capabilities.

Transmitters with Ring Resonators for Quantum Key Distribution

FIG. 1A shows a schematic of a transmitter 100 including ring resonators to modulate pulses of light for quantum key distribution. The apparatus 100 includes two ring resonators: a first ring resonator 120a and a second ring resonator 120b (collectively referred to as ring resonators 120). The first ring resonator 120a is evanescently coupled to a first input waveguide 110a. A first detector 130a is coupled to the end of the first input waveguide 110a to monitor the intensity of the input light propagating in the first input waveguide 110a. Similarly, the second ring resonator 110b is evanescently coupled to a second input waveguide 110b, which is further coupled to a second detector 130b at the end. A common output waveguide 140 is evanescently coupled to the two ring resonators 120 to guide light coupled out from the ring resonators 120. The output light then can be used for possible quantum keys.

Each ring resonator 120a/b also includes a corresponding modulator 125a/b, which can perform several functions. In one example, the modulators 125a and 125b (collectively referred to as modulators 125) can apply a time delay to light pulses propagating in the ring resonators 120. To this end, the modulators 125 can change the optical path length of the ring resonators 120 by changing the refractive index of the ring resonators 120 via the thermal-optical effect, electro-optical effect, or any other method known in the art. In another example, the modulators 125 can control the timing of light pulses that are delivered by the ring resonators 120. To this end, the ring resonators 120 can trap light (i.e., without transmitting the light to the output waveguide 140) without modulation. Upon modulation, the ring resonators 120 can change their resonance conditions and transmit light to the output waveguide 140. In this case, by controlling the timing of the modulation, the timing of the outputs from the ring resonators 120 can also be adjusted.

Figure 1B:
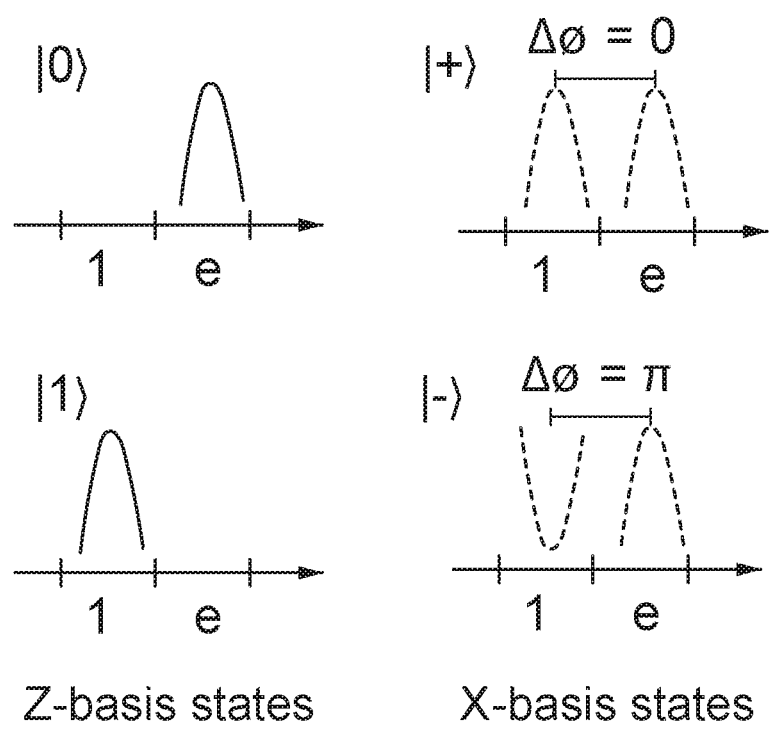
FIG. 1B illustrates the generation of qubits using the transmitter shown in FIG. 1A.

FIG. 1B illustrates the operation of the apparatus 100 to generate qubits for quantum key distributions. The apparatus 100 can generate four types of qubits: |0> and |1> states in Z-basis and |+> and |−> states in X-basis. As shown in FIG. 1B, photonic qubit states in time-bin encoding "e" and "l" correspond to early and late time bins, respectively. Solid lines correspond to a single photon pulse in the time bin. Dashed lines correspond to a single photon superposition between the two time bins. The phase difference between pulses in the two time bins is indicated by $\Delta \varphi$.

To prepare states in the Z-basis, a pulse can be modulated in the early time bin or in the late time bin (states |0> or |1>, respectively) using one of the ring resonators 120. In other words, within a specified time slot divided into two bins (i.e., an early bin and a late bin), modulating the ring resonator 120a or 120b to couple out one photon to the output waveguide 140 during the early bin (e.g., within the first half of the time slot) yields a qubit in the |0> state. On the other hand, modulating the ring resonator 120a or 120b to couple out one photon to the output waveguide 140 during the late bin yields a qubit in |1> state.

To prepare states in the X-basis, both ring resonators 120a and 120b can be used. To prepare the |+> state, a pulse can be created in the early time bin using one resonator 120a or 120b and another pulse in the late time bin using the same resonator 120a or 120b. The difference between the two time bins can be integer multiples of the light oscillation period in the selected ring resonator 120a or 120b. To prepare the |−> state, a pulse can be created in the early time-bin using one resonator (e.g., 120a) and another pulse in the late time-bin using the other resonator (e.g., 120b) such that the two pulses from the two ring resonators 120a/b destructively interfere with each other.

Alternatively, |+> and |−> qubits in the X-basis can be created using two ring resonators 120. To create a qubit in |+> state, the two pulses from the two ring resonators 120 can constructively interfere with each other. To create a qubit in |−> state, the two pulses from the two ring resonators 120 can destructively interfere with each other.

To facilitate the operation of the apparatus 100, a calibration step can be performed before qubit generation for quantum key distribution. The calibration can be carried out by tuning the laser wavelength such that the outputs from the ring resonators 120a and 120b destructively interfere with each other. One user, e.g. Alice, can then broadcast the wavelength she uses to Bob.

The apparatus 100 shown in FIG. 1A uses two ring resonators 120 for illustrative purposes. In practice, the apparatus 100 can include more than two ring resonators so as to further increase the flexibility of quantum key distribution. For example, the apparatus 100 can include four ring resonators for each transmitter used by Alice and Bob. Each time Alice and Bob create a qubit, they can choose to use two of the ring resonators. Alice or Bob can then broadcast which two ring resonators are to be used. This can ensure that both Alice and Bob maintain indistinguishability between Alice's signals and Bob's signals.

The entire apparatus 100 can be fabricated in a single chip so as to decrease the size and improve the miniaturization and compactness. Various thin-film based platforms can be employed to fabricate the apparatus 100. In one example, the apparatus 100 can be fabricated on a silicon-on-insulation (SOI) platform. In another example, the apparatus 100 can be fabricated on a lithium niobate platform (also referred to as lithium niobate-on-insulator platform). In yet another example, the apparatus 100 can be fabricated on an aluminum nitride (AlN) platform. In yet another example, the apparatus 100 can be fabricated on a silicon nitride.

The input waveguides 110a and 110b in the apparatus 100 receive input light to generate potential quantum keys. In one example, the two input waveguides 110a and 110b can be coupled to a common light source that delivers the input light. In another example, the two input waveguides 110a and 110b can receive input light from separate light sources.

In operation, the input waveguides 110a and 110b can receive single photon pulses (i.e., each pulse includes a single photon) and transmit the pulses to the ring resonators 120a and 120b. Various types of light sources can be used to deliver the input light. In one example, the input light can be generated from a phase-randomized attenuated laser input (e.g., attenuated to single photon intensities). Attenuated coherent light sources can obey Poisson statistics and may emit single photons by tuning the mean photon number to be one from a statistical point view. In another example, the input waveguides 110a and 110b can receive light from single quantum dots in III-V and II-VI semiconductor heterostructures, or single trapped atoms and ions, which can also be used as single-photon emitters. In yet another example, the input waveguides 110a and 110b can receive input light from color centers combined with vacancy centers in diamond, such as N-vacancy centers, Ni—N complexes, Si-vacancy centers, and Xe-vacancy centers.

The ring resonators 120 in the apparatus 100 are employed to modulate the phase and/or amplitude of the input light. The ring resonators 120 can be fabricated using existing semiconductor fabrication techniques. Various materials may be used to form the ring resonators 120 (and the input/output waveguides 110/140), such as silicon, germanium, silicon oxide, silicon nitride, and chalcogenide glass.

The diameter of the ring resonators 120 may depend on, for example, the desired resonance wavelength and/or the desired number of supported longitudinal modes. As understood in the art, the resonance wavelength $\lambda$ of the mth mode in a ring resonator is $\lambda = D\pi n_{eff}/m$, where D is the resonator diameter, $n_{eff}$ is the effective refractive index (RI) of the mth mode of the ring resonator, and m is an integer. The resonance wavelength of the ring resonators 120 can be about 1 μm to about 40 μm (e.g., 1 μm, 5 μm, 10 μm, 15 μm, 20 μm, 25 μm, 30 μm, 35 μm or 40 μm). In one examples, the ring resonators 120 support only one longitudinal mode (e.g., m<1 for a given D and $\lambda$). In another example, the ring resonators 120 support multiple longitudinal modes. In yet another example, the resonant wavelength of the ring resonators 120 can be similar to those used in optical communications (including the internet), including wavelengths between about 1.4 μm and about 1.7 μm (e.g., 1.4 μm, 1.5 μm, 1.55 μm, 1.6 μm, 1.65 μm, and 1.7 μm). In practice, the diameter D of the ring resonators 120 can be about 5 μm to about 150 μm (e.g., 5 μm, 7.5 μm, 10 μm, 15 μm, 20 μm, 25 μm, 30 μm, 40 μm, 50 μm, 60 μm, 70 μm, 80 μm, 90 μm, 100 μm, 110 μm, 120 μm, 130 μm, 140 μm, or 150 μm). The cross section of the ring resonators 120 can have various shapes, such as round, oval, rectangular, square, or any other shape known in the art. In one example, the cross section of the ring resonators 120 can have a size that is about 220 nm by 500 nm.

The two ring resonators 120 can either share a common light source or use separate light sources. The two ring resonators 120 can be either identical or slightly different. For example, the two ring resonators 120 can have similar quality factors (Q) and their resonance can be fine-tuned using thermo-optic heaters. The distance between the two resonators 120 can be, for example, greater than 200 nm (e.g., about 200 nm, 500 nm, 1 μm, 2 μm, 5 μm, 10 μm, 20 μm, 30 μm, 40 μm, 50 μm, or greater) so as to reduce interference of evanescent modes.

The ring resonators 120 may also be replaced or supplemented by other photonic elements that can also perform phase and/or amplitude modulation to light pulses. In one example, the apparatus 100 can include Mach-Zehnder Interferometers (MZIs) with a modulation element to modulate input light. The modulation element can be a doped semiconductor depletion junction or an injection junction. The modulation element may be also based on thermal-optical effects or $X^2$ nonlinear effects. In another example, the apparatus 100 can include photonic crystal cavities, which can include a doped semiconductor depletion junction, an injection junction, a thermal-optical modulation element, an electro-optical modulation element, or their combinations to modulate input light. In yet another example, the apparatus 100 can include a Fano-resonance based device with a doped semiconductor depletion junction, an injection junction, a thermal-optical modulation element, an electro-optical modulation element, or combinations thereof to modulate input light.

The modulators 125 used for the ring resonators 120 can be based on various mechanisms, depending on, for example, the desired form factor, dynamic range of modulation, power consumption, or any other operation parameter. In one example, the modulators 125 can include a piezo-electric element or other suitable element configured to apply a mechanical force to the ring resonator 120 so as to modulate the refractive index of the ring resonator 120. The mechanical force can be applied via, for example, compression, bending, stretching, shearing, or any other means known in the art.

In another example, the modulators 125 can be configured to apply an electric field to the ring resonator 120 so as to modulate the refractive index of the ring resonator 120. For example, the modulator 125 may apply the electric field via two electrodes, with one electrode attached to the top of the ring resonator 120 and the other electrode attached to the bottom of any substrate supporting the ring resonators 120. Alternatively or additionally, the electrodes can be attached to a perimeter of the ring resonator 120.

In yet another example, the modulators 125 can be configured to vary a temperature of the ring resonator 120. For example, the modulators 125 can include a semiconductor heater fabricated in thermal communication with (e.g., beside) the ring resonator 120. In another example, the modulators 125 can include a semiconductor heater fabricated beneath the ring resonators 120 or within the ring resonators 120 (e.g., see FIG. 1A). In yet another example, the modulators 125 can include an external heater such as an oven that substantially encloses the entire apparatus 100 so as to uniformly change the temperature of the ring resonators 120.

In yet another example, the modulators 125 are configured to apply an acoustic field to the ring resonators 120 so as to modulate the refractive index of the ring resonators 120. In other examples, the modulators 125 can be configured to apply a magnetic field to the ring resonators 120 so as to modulate the refractive index of the ring resonators 120.

If the ring resonators 120 comprises chalcogenide glass, the modulators 125 can apply an optical field on the ring resonators 120 so as to modulate the refractive index of the ring resonators 120. As understood in the art, chalcogenide glasses can exhibit several photo-induced effects, including photo-crystallization, photo-polymerization, photo-decomposition, photo-contraction, photo-vaporization, photo-dissolution of metals, and light-induced changes in local atomic configuration. These changes are generally accompanied by changes in the optical band gap and therefore optical constants. In addition, chalcogenide glasses also have strong third-order nonlinear effects. Therefore, a modulator comprising chalcogenide glass can adjust the optical properties of the ring resonators 120 by applying a modulating optical field (separate from the light circulating in the ring resonators 120) to the ring resonators 120.

The detectors 130 coupled to the input waveguides 110 are employed to monitor the intensity of the input light so as to determine, for example, whether the input light comprises single photons or whether sufficient light is coupled into the ring resonators 120. Generally, it can be desirable for the detectors 130 to respond to single photons. In one example, the detectors 130 include detectors using heterojunctions based on dopants. In another example, the detectors 130 include metal-semiconductor-metal photoconductors. In yet another example, the detectors 130 include superconducting nanowire single photon detectors (SNSPDs). In yet another example, the detectors 130 include transition edge sensors.

In operation, the detectors 130 can be used for monitoring signals, for example, when the system is operating in continuous mode (e.g., for days or months) to ensure that correct modulation is used. In addition, an addition detector can be placed right before the output for monitoring light that enters Alice's apparatus (i.e., the light going the wrong way). This detector can be useful to prevent Trojan horse attack, where an eavesdropper tries to send a bright light into Alice's apparatus in order to look for its reflections.

In practice, the apparatus 100 shown in FIG. 1A is used as a transmitter in quantum key distribution. Each of the two communicating parties Alice and Bob can have a transmitter like on the apparatus 100. The two transmitters can also be identical to each other. In MDI-QKD, Alice and Bob can send the output of their transmitters to a third party (Charlie), who uses a receiver chip for measurements. Alice and Bob then can generate quantum keys based on the measurements announced by Charlie (see, e.g., the background section).

Receivers for Quantum Key Distribution

Figure 2:
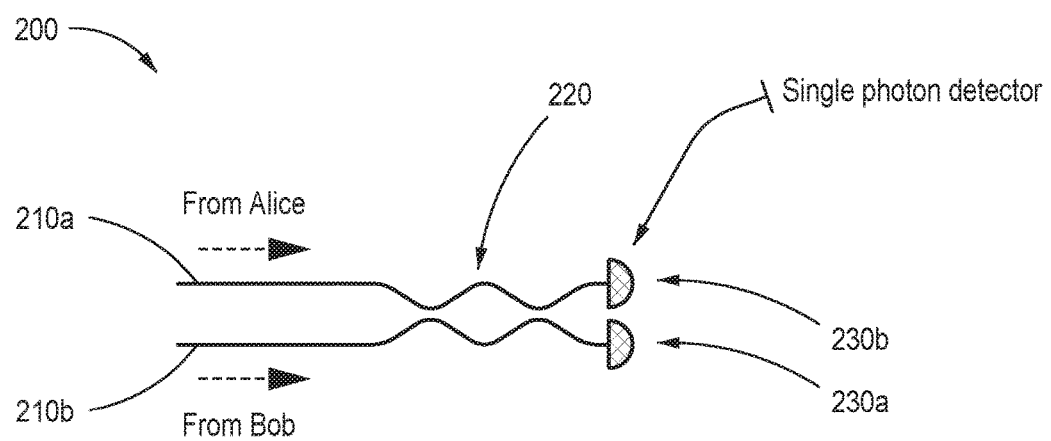
FIG. 2 shows a schematic of a photonic integrated receiver that can be used with the transmitter shown in FIG. 1A.

FIG. 2 shows a schematic of a receiver 200 that can be used by Charlie to detect and measure signals provided by Alice and Bob. The receiver 200 includes two input waveguides 210a and 210b to receive qubits sent by Alice and Bob, respectively. A 50-50 coupler 220 combines the two signals received by the two input waveguides 210a and 210b. Two detectors 230a and 230b are coupled to the two output ports of the coupler 220 to make Bell measurements. In operation, the receiver 200 can measure the state $|\psi-\rangle$ of the four possible Bell states (see, e.g., Table 1). Therefore, no key is generated from the other three Bell states. Referring back to Table 1, Bob can flip his bits for all successful detections. Charlie can declare a successful detection of $|\psi-\rangle$ state when one detector clicks in the early time-bin and the other clicks in the late time-bin. Similar to the apparatus 100 shown in FIG. 1A, the receiver 200 can also be fabricated in chip-scale (e.g., on or in a semiconductor substrate) for miniaturization and compactness.

Phase-Shifting Transmitters for Quantum Key Distribution

Figure 3:
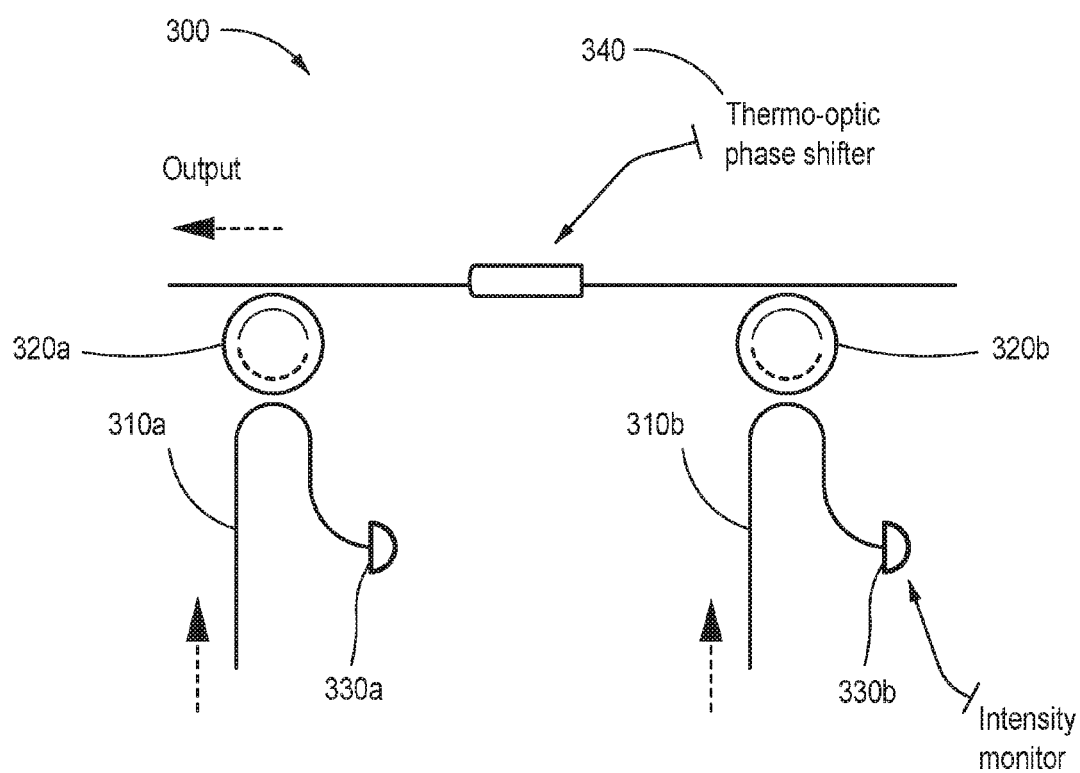
FIG. 3 shows a schematic of a photonic integrated transmitter including ring resonators and a phase shifter to generate qubits for quantum key distribution.

FIG. 3 shows a schematic of an apparatus 300 including a phase shifter for quantum key distribution. The apparatus 300 includes two ring resonators 320a and 320b, each of which is evanescently coupled to a respective input waveguide 310a/b on one side and to a common output waveguide 340 on another side. Two detectors 330a and 330b are coupled to the end of the two input waveguides 310a and 310b, respectively, to monitor the intensity light propagating in the input waveguides 310a and 310b. A phase shifter 340 is coupled to the output waveguide 340 at a location between the two ring resonators 320a and 320b. As shown in FIG. 3, output light from the ring resonator 320b can undergo a phase shift applied by the phase shifter 340 before reaching the output of the apparatus 300, while the output light from the ring resonator 320a can bypass the phase shifter 340. In this case, the phase shifter 340 can adjust the relative phase between the two outputs from the two ring resonators 320 so as to adjust the states of the qubits delivered by the apparatus 300.

In one example, the phase shifter 340 imposes a $\pi$-phase shift on light that propagates through the phase shifter 340 such that the outputs from the two ring resonators 320a and 320b destructively interfere with each other. In practice, the two parties Alice and Bob can agree on the wavelengths of their lasers so as to maintain indistinguishability between their signals.

Figure 4:
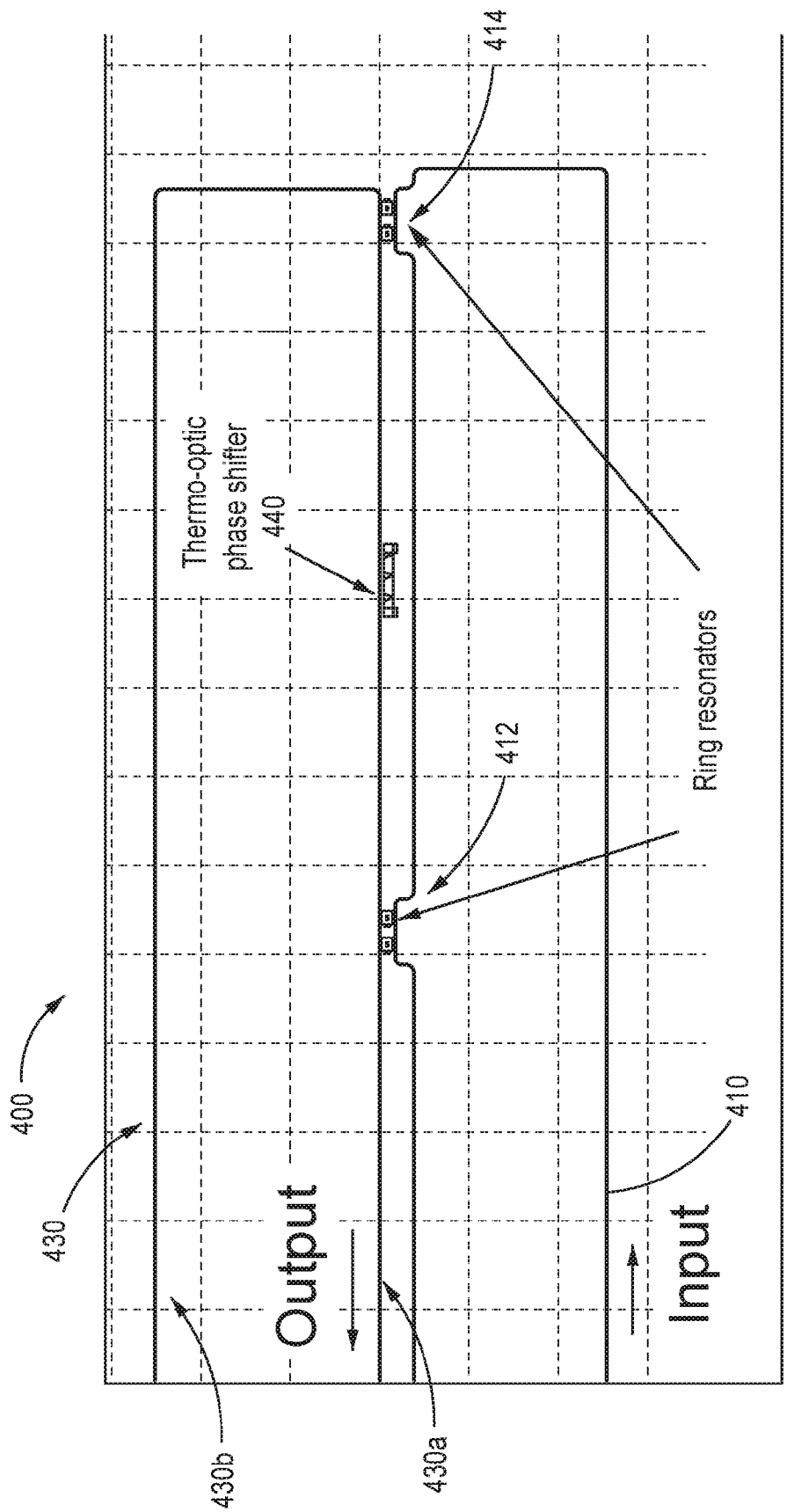
FIG. 4 shows a schematic of a completed layout of the transmitter shown in FIG. 1A and FIG. 3.

FIG. 4 shows a completed layout of a transmitter 400 that can be used for quantum key distribution. The transmitter 400 includes an input waveguide 410 and an output waveguide 430 including a first portion 430a and a second portion 430b. The first portion 430a of the output waveguide 430 is substantially parallel to the input waveguide 410. Two groups of ring resonators 412 and 414 are disposed between the first portion 430a of the output waveguide 430 and the input waveguide 410 for isolation to generate qubits for quantum keys in a manner substantially similar to the one described with reference to FIG. 1A and FIG. 3. A phase shifter 440 is coupled to the first portion 430a of the output waveguide 430 to impose a phase shift (e.g., a π phase shift) to the output light from one group of ring resonators (i.e. ring resonators 412) but not the other.

In the transmitter 400 shown in FIG. 4, two ring resonators (instead of a single one as shown in FIG. 3) are used for each group 412 and 414 to increase extinction ratio when generating qubits. In general, two ring resonators placed in series can behave like two commercial electro-optic modulators in series and therefore can improve the extinction ratio should be higher. In another example, each group of ring resonators 412 and 414 can also include more than two ring resonators.

The apparatus shown in FIGS. 1A, 1B, 3, and 4 include individual ring resonators (e.g., 120a, 120b, 320a, or 320b) to modulate light pulses. To improve the isolation, multiple ring-resonators may be implemented at the locations where single ring-resonators are used. Furthermore, an additional hair-clip loop structure may also be added to further improve the isolation.

Hair-Clip Loop Structures for Improved Isolation

Figure 5:
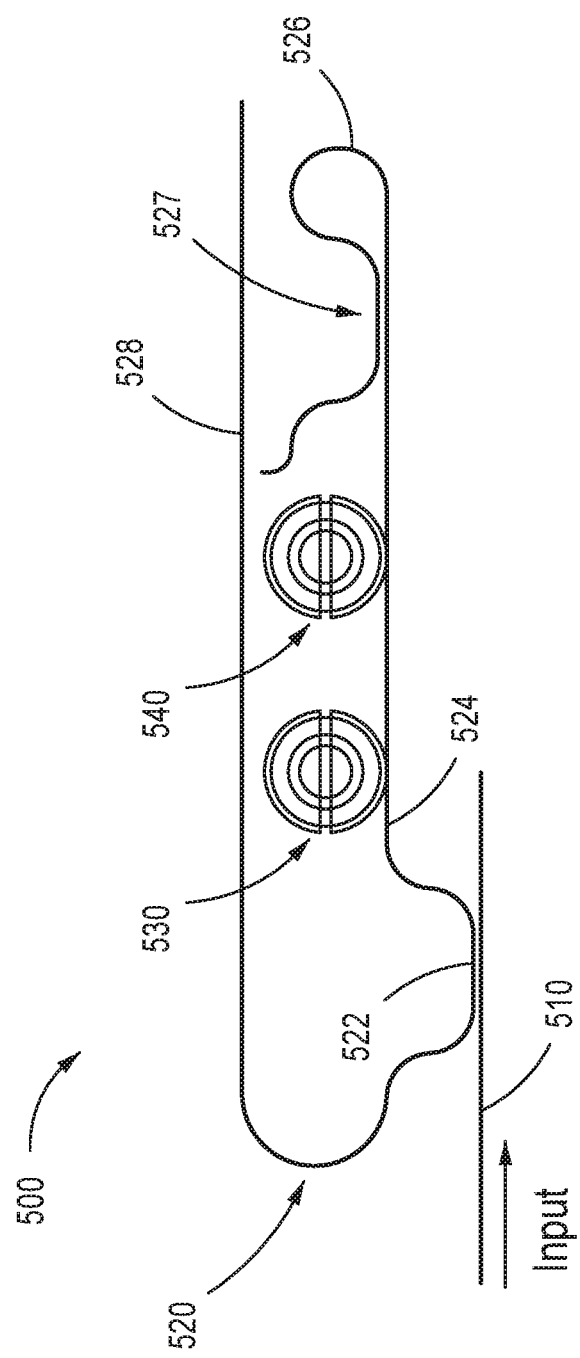
FIG. 5 shows a schematic of a hair-clip double-pass configuration of ring resonators that can be used for quantum key distribution.

FIG. 5 shows a hair-clip loop structure 500 that can be used to improve isolation of ring resonators in a transmitter for quantum key distribution. The structure 500 includes an input waveguide 510 to receive input light. The structure 500 also includes an output waveguide that has several sections: a receiving section 522, a propagation section 524, a loop section 526, and an output section 528. The receiving section 522 is substantially parallel to the input waveguide 510 so as to direct light from the input waveguide 510 to the output waveguide 520 via evanescent coupling. The propagation section 524 guides the light received by the receiving section 522 and can be further away from the input waveguide 510 so as to decrease interference of light from the input waveguide 510. Two ring resonators 530 and 540 are evanescently coupled to the propagation section 524 of the output waveguide 520 for generating qubits. The loop section 526 bends back toward the propagation section 524 and includes at least one portion that is evanescently coupled to the propagation section 524. In this manner, at least a portion of the input light can be coupled back to the propagation section 524 after propagating through or bypassing the two ring resonators 530 and 540. The light coupled back to the propagation section 524 propagates in the opposite direction with respect to the input light received by the receiving section 522 and exit the structure 500 via the output section 528. 3

QKD Transmitters Including Unbalanced Interferometers

As introduced above, the ring resonators in the apparatus shown in FIG. 1A and FIG. 3 are employed to modulate the phase and amplitude of photos to generate qubits of a desired state. The phase and/or phase modulation can also be achieved by other photonic elements, such as an interferometer.

Figure 6:
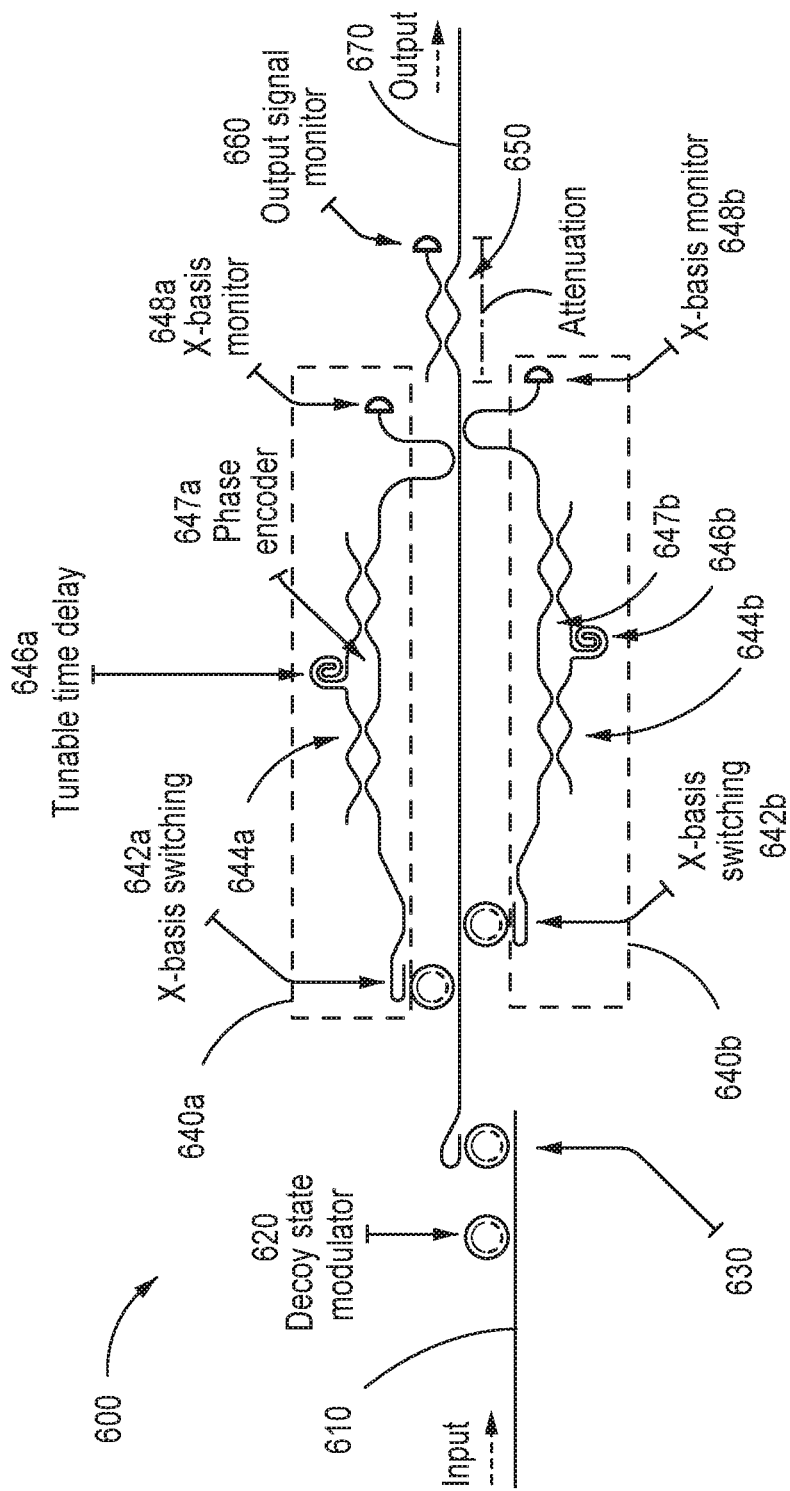
FIG. 6 shows a schematic of a QKD transmitter including unbalanced interferometers.

FIG. 6 shows a schematic of a transmitter 600 including both ring resonators and unbalanced interferometers to generate qubits as quantum keys. The transmitter 600 includes an input waveguide 610 to receive input light (e.g., single photon pulses, phase-randomized laser pulse, etc.). A decoy state modulator 620 (e.g., a ring resonator) is coupled to the input waveguide 610 to generate decoy state, if needed. Because typically the decoy states have lower intensities than the signal state, Alice and Bob can attenuate the laser pulse when preparing decoy states. A time-dependent intensity modulator 630 is also coupled to the input waveguide 610 to modulate the input light and can generate states in Z-basis ($|0\rangle$ and $|1\rangle$). The $|0\rangle$ and $|1\rangle$ states in this encoding correspond to single-photon signals in the early and late time-bins, respectively.

The attenuation of laser pulse described herein is with respect to average photon number. Because the photon number distribution in a laser usually is Poissonian, even when the light is attenuated to an average photon number of 1, there can still be a non-zero probability of emitting photons other than single photons (e.g., zero photo, two photons, three photons, etc.). Therefore, even a single photon pulse can be further attenuated to have an average photon number less than one (e.g., 0.5, 0.3, or less). The number of photons emitted at any single time can be discrete (i.e., an integer), but the probability of emitting more than one photon is lower so that the average photon number output is less than 1.

The amount of attenuation for decoy states can depend on the experimental parameters or can be chosen arbitrarily. One decoy state (one attenuation setting) can be used for short distance communications. Typically two decoy states (two attenuation settings) are used. Usually in this two-decoy-state protocol, the first decoy state can have ½ or ¼ the intensity of the signal state and the second decoy state can be vacuum (i.e., no light is being sent at all). In some examples, the sum of the intensity of the two decoy states can be less than the intensity of the signal state.

The modulator 630 output can be directed to three different channels: a top channel 640a, a bottom channel 640b, and a middle channel (also referred to as pass-through channel) 670 that is also the output waveguide 670. The top channel 640a includes a basis switch 642a (e.g., a ring resonator as shown in FIG. 6) to couple the input light into the top channel 640a. The received light then propagates into an unbalanced interferometer 644a including two arms that have different optical path lengths. One arm has a tunable time delay 646a and the other arm has a phase encoder 647a. The output of the interferometer 644a is evanescently coupled back to the output waveguide 670, while a detector 648a is used to monitor the intensity of the output.

The bottom channel 640b has a similar structure, including a basis switch 642b to couple light into the bottom channel 640b and an unbalanced interferometer 644b to modulate the received light. The interferometer 644b also includes a tunable time delay 646b on one arm and a phase encoder on the other arm. The output of the interferometer 644b is coupled to the output waveguide 670 and a detector 648b monitors the intensity of the output.

The middle channel 670 is also the output waveguide 670. The outputs from any of the three channels 640a, 640b, and 670 enters an MZI 650, which is configured to be an attenuator. A detector 660 is placed on one port of the MZI for monitoring the power output. Alice and Bob can attenuate their signals to single-photon intensity based on the signals acquired by the detector 660. Their outputs are then sent towards Charlie who operates the receiver chip (e.g. shown in FIG. 2).

The basis switches 642a and 642b allow Alice and Bob to choose between sending a quantum signal in the Z-basis or the X-basis. If Alice or Bob decides to send a signal in the Z-basis, the input light is directed to the middle channel 670. If Alice or Bob wants to send a signal in the X-basis, the input light is directed to either to the bottom channel 640b or to the top channel 640a. Encoding in the X-basis uses the unbalanced interferometers 644a and 644b, where one arm is longer than the other. The tunable delays 646a and 646b can have a length $cT_{bin}$, where c is the speed of light in the waveguide and $T_{bin}$ is the size of the time bin. The size of the time bin can be larger than the jitter time of photon detectors (648a and 648b).

The phase encoders 647a and 647b can be set to provide any arbitrary phase shift between 0 and π. In principle, any phase difference between the superposition states can be generated using either the top interferometer 644a or the bottom interferometer 644b. For example, the top phase encoder 647a can provide no phase shift ($\Delta\Phi=0$) and the bottom phase encoder 647b can provide π-phase shift ($\Delta\Phi=\pi$).

At this point, if Alice or Bob has prepared a signal placed in the early time-bin (the state $|0\rangle$) and the signal is directed towards the top interferometer 644a, the signal turns into a superposition between the early and late time-bins (the state $|+\rangle=(|0\rangle+|1\rangle)/\sqrt{2}$. On the other hand, if the $|0\rangle$ signal is directed towards the bottom interferometer 644b, it is converted into the state $|-\rangle=(|0\rangle-|1\rangle)\sqrt{2}$. With a detector 648a/b after each interferometer 644a/b, Alice and Bob could monitor the power of the interferometer outputs. Regardless of what state the signal was encoded in, the interferometer outputs are coupled back towards the main (middle) waveguide path 670.

The components in the transmitter 600 are for illustrative purposes only. In practice, other components can also be used to achieve similar functions. For example, the decoy state modulator 620 and the modulator 630 can include intensity modulation devices or a phase modulator embedded in an interferometric device. Each basis switch 642a and 642b can include a mode-coupling device along with a phase modulator. The time delays 646a and 646b can be implemented with a wound waveguide structure, a phase modulation scheme, or cavities with high quality factors or waveguide-based delays.

Figure 7:
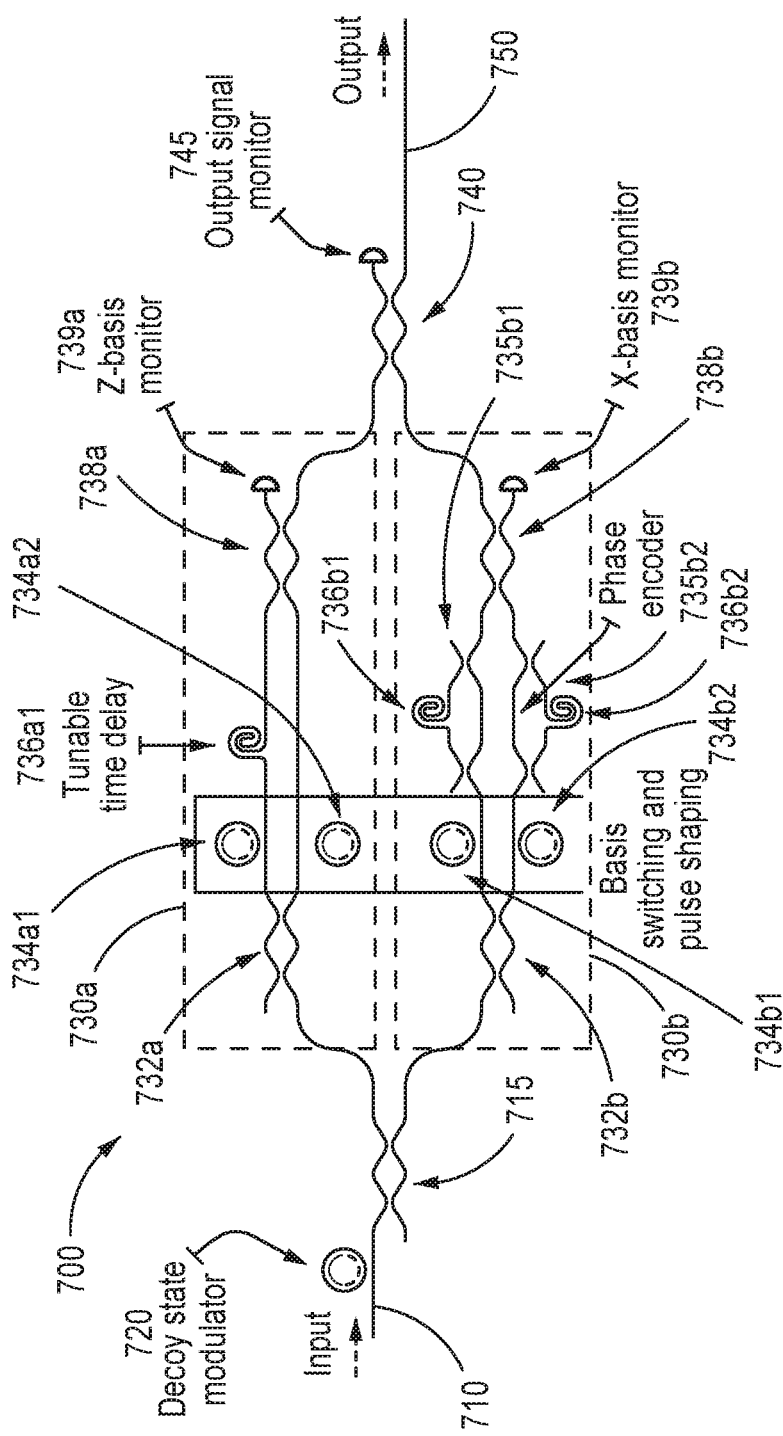
FIG. 7 shows a schematic of a QKD transmitter

FIG. 7 shows a schematic of another transmitter 700 including ring resonators and interferometers to generate qubits. The transmitter 700 includes an input waveguide 710 to receive input light (e.g., single photon pulses). A decoy state modulator 720 is coupled to the input waveguide 710 to produce decoy states upon demand. A coupler 715 is also coupled to the input waveguide 710 to direct the input light to two different channels: a Z-basis channel 730a to generate qubits in Z-basis and an X-basis channel 730b to generate qubits in X-basis.

The Z-basis channel 730a includes a coupler 732a (e.g., a directional coupler) to direct the received light into two beam paths. The top path includes a first ring resonator 734a1 and a tunable time delay 736a1. The bottom path includes a second ring resonator 734a2 but without a time delay. Creating a pulse in the first ring resonator 734a1 can generate the state |1> due to the time delay 376a1 and creating a pulse in the second ring resonator 734a2 can generate the state |0>. The generated qubits from one or both ring resonators 734a1 and 734a2 are sent to another coupler 738 with one output port coupled to a detector 739a to monitor the output power and the other output port coupled to an output coupler 740. The output coupler 740 also has two output ports, with one port coupled to a detector 745 to monitor output power and the other output port coupled to (or function as) an output waveguide 750 to deliver the qubits as potential quantum keys.

The X-basis channel 730b also includes a coupler 732b to direct the received light into two beam paths. The top path includes a first ring resonator 734b1 and an unbalanced interferometer 735b1. One arm of the interferometer 735b1 includes a time delay 736b1 and the other arm includes a phase encoder (not labeled). Similarly, the bottom path includes a second ring resonator 734b2 and an unbalanced interferometer 735b2. The interferometer 735b2 includes a time delay 736b2 on one arm and a phase encoder (not labeled) on the other arm. Light pulses after either arm propagate into a coupler 738b with two output ports: one port is coupled to a detector 739b to monitor output power and the other port delivers the generated qubits to the output coupler 740.

In operation, the phase encoders in each unbalanced interferometer 735b1 and 735b2 can provide the phase difference for a superposition state between the early and late time-bins. For example, the top and the bottom phase encoders in the interferometers 735b1 and 735b2 can provide 0 and π phase differences, respectively. Then, to generate the |+> state, a pulse can be created in the early time-bin using the ring resonator 734b1 and propagate through the interferometer 735b1 for temporal superposition. To generate the |−> state, a pulse is created using the ring resonator 734b2 and propagates through the interferometer 735b2 for temporal superposition.

The intensity of the light after state preparation can be checked using the Z-basis and the X-basis monitors 739a and 739b, respectively. The output signal monitor can also be used to ensure that the intensity of light prepared in the two different bases is indistinguishable.

Figure 8:
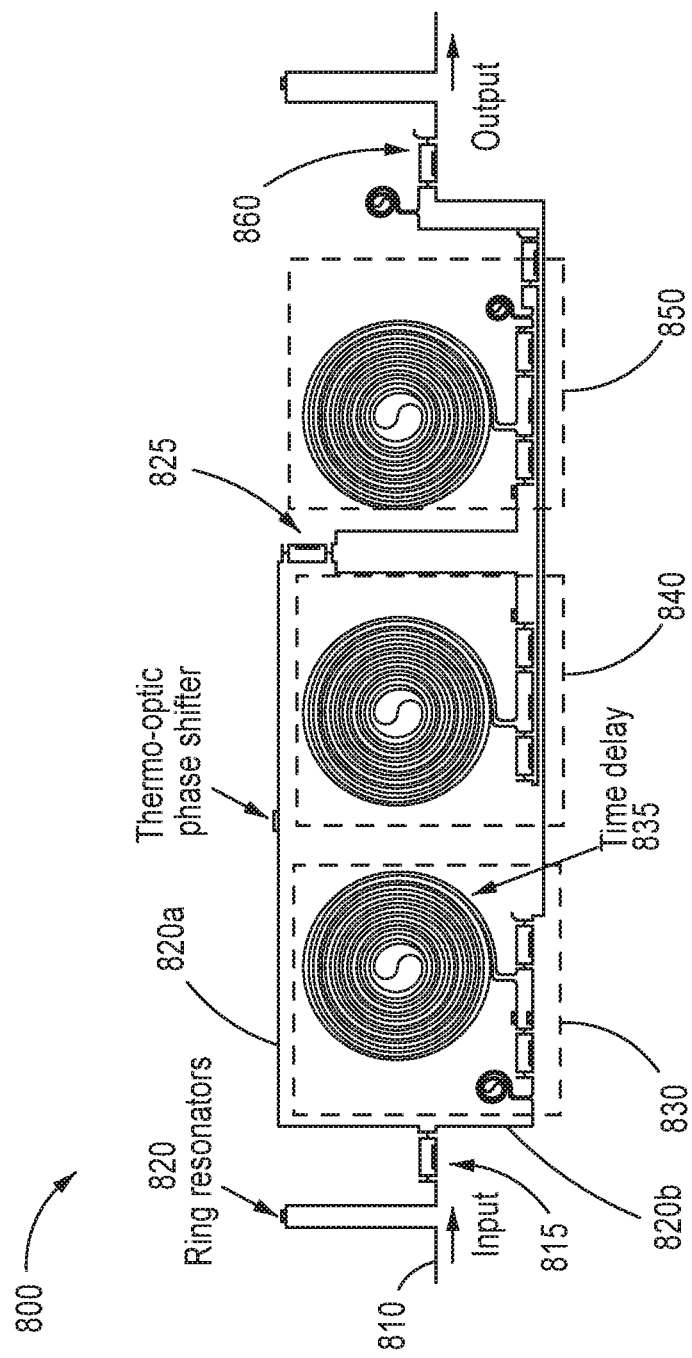
FIG. 8 shows a schematic of a completed layout of the transmitter shown in FIG. 7.

FIG. 8 shows an example layout of a completed transmitter using the approach shown in FIG. 7. The layout can be used to achieved, for example, a desired form factor for the resulting device. The transmitter 800 includes an input waveguide 810 to receive input light, which then propagates into a group of ring resonators 820 for isolation. A coupler 815 is coupled to the input waveguide 810 to direct the input light to two different channels: the X-basis channel 820a and the Z-basis channel 820b. The X-basis channel further includes a coupler 825 to direct the input light into two different paths 840 and 850, each of which includes an interferometer, which can be substantially similar to the interferometers 735b1 and 735b2 shown in FIG. 7. One path (840 or 850) can generate qubits in state |−> while the other path (850 or 840) can generate qubits in state |+>. The Z-basis channel 820b can be substantially similar to the Z-basis channel 730a shown in FIG. 7 and includes two arms of different optical path lengths. A time delay 835 is disposed in one of the arm to achieve the unbalanced optical path lengths. The output of the two channels 820a and 820b are transmitted to an output coupler 860, which delivers the generated qubits for potential quantum keys and also delivers a portion of the output for power monitoring.

Methods of Generating Qubits for Quantum Key Distribution

Figure 9:
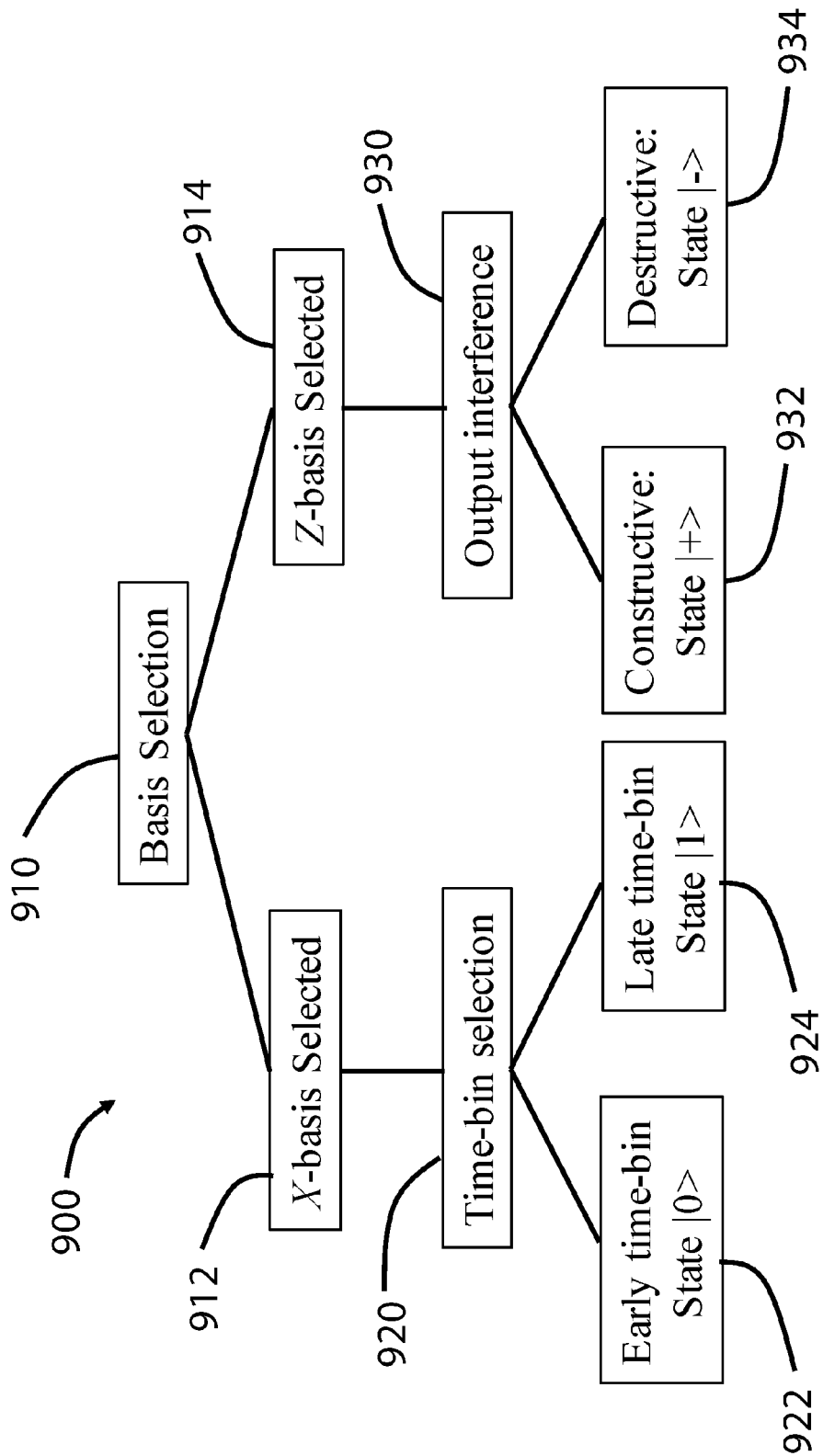
FIG. 9 illustrates a method of generating and distributing quantum keys.

FIG. 9 illustrates a method of generating qubits that can be used as quantum keys. The method 900 starts from basis selection at step 910, in which either the X-basis or the Z-basis is selected. The selection can be random so as to increase the security of the subsequent quantum key distribution.

In response to the selection of the X-basis at step 912, the method 900 proceeds to step 920, in which a time-bin selection is made so as to encode one bit of information (e.g., 0 or 1) into the photon and generate a qubit. A |0> state is created if the early time-bin is used, as shown in step 922. A |1> state is created if the late time-bin is used, as shown in step 924.

In response to the selection of the Z-basis at step 914, the method 900 proceeds to step 930, in which output light pulses from two modulators (e.g., two ring resonators shown in FIG. 1A and FIG. 3, or two arms of an interferometer shown in FIGS. 6-7) are tuned to interfere with each other. The type of interference can encode one bit of information into the photon and generate a qubit. Constructive interference generates a photon in state |+> while destructive interference generates a photon in state |−>.

QKD Transmitters Using Polarization Encoding

The apparatus and methods described above usually employ a time-bin encoding technique to encode information into photons. Alternatively, polarization encoding can also be used in the apparatus and methods described herein.

At least two methods of achieving polarization control in a PIC can be used herein. One is using a polarizing beam splitter and another is to use Berry's phase modulators. More information regarding these two techniques can be found in Su et al., Optics Letters, 39 No. 4 (2014) and Xu et al., Nature Comm., 5 5337 (2014), both of which are hereby incorporated by reference in their entireties.

In a polarization encoding approach, the output of an attenuated phase-randomized laser source is modulated into pulses by ring modulators. In one example, the polarization of these light pulses can be rotated using Berry's phase modulators. To prepare states in the Z-basis, Alice or Bob can rotate the polarization such that the photon either has a horizontal ($|H\rangle=|0\rangle$) or a vertical ($|V\rangle=|1\rangle$) polarization. For the states in the X-basis, Alice or Bob can rotate the polarization such that the resulting polarization is oriented along the +45° angle ($|+\rangle$) or along the −45° angle ($|H\rangle=|-\rangle$)).

In another example, when an on-chip polarizing beam splitter (PBS) is used, an unpolarized light pulse can be incident on a PBS. To prepare states in the Z-basis, Alice or Bob can use the photons out of the horizontal output port as the $|H\rangle$ qubit and the photons out of the vertical output port as the $|V\rangle$ qubit. For states in the X-basis, Alice or Bob can mix the two outputs of the PBS in a balanced MZI such that a photon at one output is a superposition state $|+\rangle=(|H\rangle+|V\rangle)/\sqrt{2}$ with no phase difference and the other output is a superposition state $|-\rangle=(|H\rangle+|V\rangle)/\sqrt{2}$ with π-phase difference.

The receiver chip can include a 50-50 coupler followed by two PBSs. One input port of each PBS is in vacuum, and a single photon detector is placed on each output port of the PBS. This chip can measure the states $|\psi^-\rangle$ and $|\psi^+\rangle$ of the four possible Bell states.

Transmitters for Continuous Variable Quantum Key Distribution

As introduced above, QKD can be implemented via various protocols, including measurement-device-independent (MDI) QKD and continuous variable (CV) QKD. Apparatus and methods described above can be applied in MDI QKD. This section describes photonic integrated circuits (PICs) that can be used for CV QKD.

The CV-QKD protocol allows two parties—Alice (the sender) and Bob (the receiver)—to generate shared secret keys. CV QKD usually involves two parties (Alice and Bob), instead of three parties (Alice, Bob, and Charlie) as in MDI QKD. Alice starts the protocol by preparing a train of coherent state pulses that are randomly modulated either in the x or p quadrature with a centered bivariate Gaussian modulation of variance $V_A N_0$, where $N_0$ is the shot noise variance. These coherent-state pulses are then sent via the quantum channel to Bob, along with a strong local oscillator (LO). The LO can be sent using several multiplexing schemes, e.g., time-multiplexing or encoding using different polarizations. In the homodyne detection scheme, once Bob receives the signals from Alice, he randomly measures the x or p quadrature by mixing the signal and the LO in a pulsed, shot-noise limited homodyne detector. In the heterodyne detection scheme, Bob performs a pulsed, shot-noise limited heterodyne measurement once he receives the signals; no random choice of which quadrature to be measured is present here. From this protocol, Alice and Bob will share a set of correlated Gaussian data, from which they apply error correction and privacy amplification to establish identical secret keys.

The rate of secret key generation (in bits per second), in the limit of large number of signals exchanged, is given by:

$$R \geq r[\beta I(A;B)-\chi(B;E)] \quad (2)$$

where r is the repetition rate and β is the reconciliation efficiency which depends on the efficiency of the error-correction codes. I(A; B) is the mutual information between Alice and Bob which can be measured as $I(A; B)=\frac{1}{2}\log_2(V+\chi_{tot})/(1+\chi_{tot})$. Here, $V=V_A+1$, where $V_A$ is the variance of Alice's Gaussian modulation expressed in shot noise units. $\chi_{tot}$ is the total added noise (in shot noise units), which arises from two different contributions: the channel and the homodyne detection setup (i.e. $\chi_{tot}=\chi_{line}+\chi_{hom}$). The added noise to the channel is $\chi_{line}=1/T-1+\varepsilon$, with T≤1 being the transmittance of the quantum channel and ε is the excess noise due to imperfections in the channel.

Noise from the homodyne detection setup can be characterized as $\chi_{hom}=(1+\upsilon_{el})\eta-1$, where $\upsilon_{el}$ is the electronic noise of the detector and η is the efficiency of the detector. Moreover, χ(B; E) is the amount of information lost to Eve, assuming collective attacks. With the entropy function $g(\chi)=(\chi+1)\log_2(\chi+1)-\chi\log_2(\chi)$, the expected amount of information lost to Eve is $\chi(B; E)=g(\lambda_1')+g(\lambda_2')+g(\lambda_3')-g((\lambda_4'))$. Here, $\lambda_k'=(\lambda_k-1)/2$, where $\lambda^2_{1,2}=\frac{1}{2}(A\pm(A^2-4B)^{1/2})$, and $\lambda^2_{3,4}=\frac{1}{2}(C\pm(C^2-4D)^{1/2})$, with $A=V^2(1-2T)+2T+T^2(V+\chi_{line})^2$, $B=T^2(V\chi_{line}+1)^2$, $C=(VB^{1/2}+T(V+\chi_{line})+A\chi_{hom})/(T(V+\chi_{tot}))$, and $D=B^{1/2}(V+B^{1/2}\chi_{hom})/(T(V+\chi_{tot}))$.

In CV QKD using a PICs, an attenuated coherent light source is used to excite a PIC that serves as a transmitter of a secret key. The transmitter, used by Alice, employs a time-multiplexing scheme based on integrated waveguide delays to combine the signal and local oscillator on a single integrated waveguide for phase stability during long-distance transmissions over optical fiber. A PIC for the receiving party (Bob) performs a time-demultiplexing procedure with an integrated waveguide to delay a portion of the signal and local oscillator. The demultiplexed signal and local oscillator are then combined on an actively balanced, phase-sensitive detector such as a heterodyne or homodyne receiver. At each stage (data encoding, multiplexing, demultiplexing and receiving), small portions of the optical power can be coupled out for monitoring so as to allow for real-time feedback and control of the key distribution system.

Figure 10:
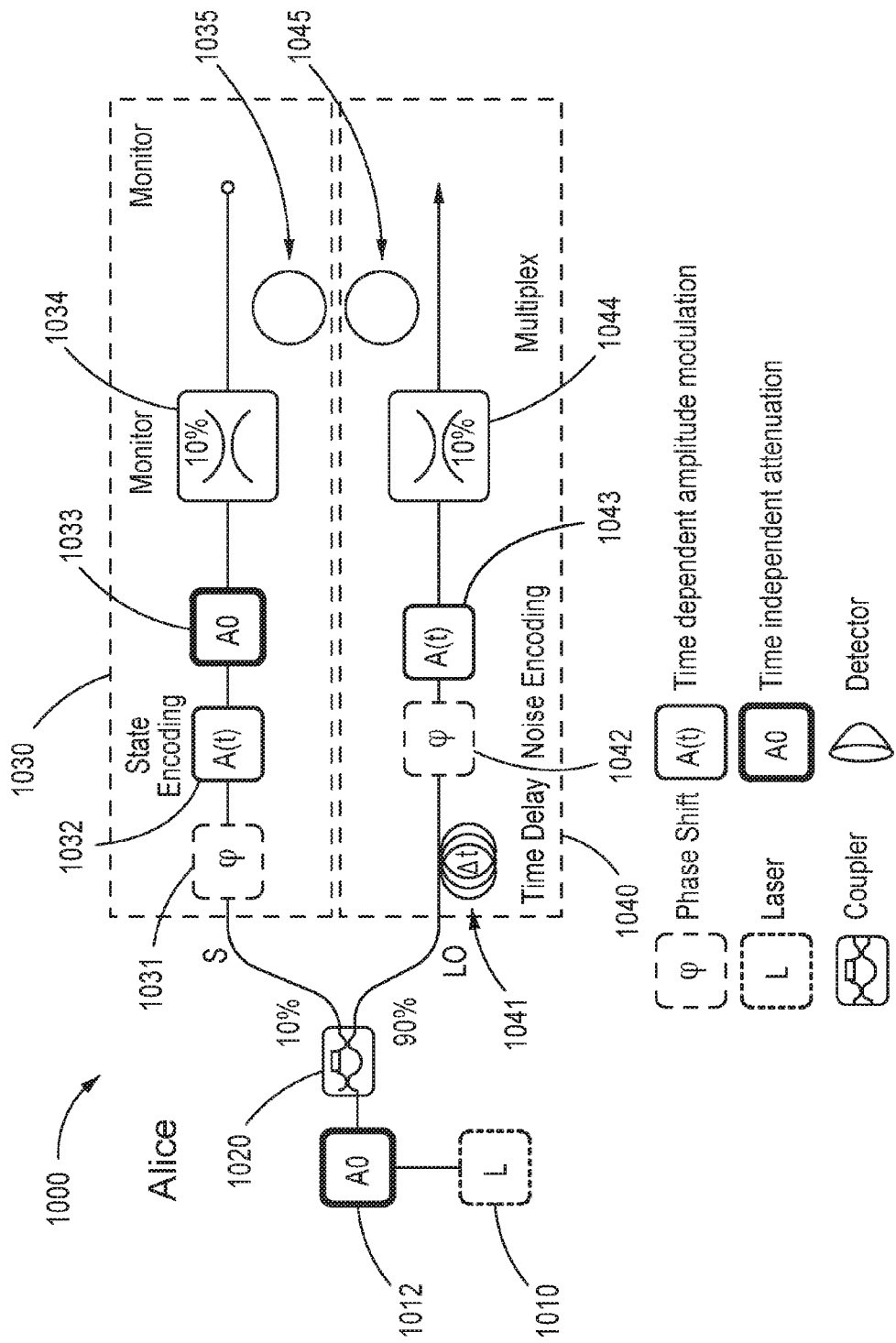
FIG. 10 shows a transmitter that can be used in continuous variable QKD.

FIG. 10 shows a schematic of an apparatus 1000 (as used by Alice) to generate qubits that can be used as quantum keys. The apparatus 1000 includes a laser source 1010 to provide laser light for the generation of quantum keys. The laser light can be continuous wave (CW) or pulses. An on-chip modulator can be used to convert CW laser beams into pulsed laser beam.

An attenuator 1012 is optically coupled to the laser source 1010 to modulate the intensity of the laser light to accommodate other components in the apparatus 1000 (e.g., saturation threshold of detectors). A coupler 1020 is connected to the attenuator 1012 to direct the laser light into two different channels (also referred to as paths): a signal channel 1030 and a local oscillator (LO) channel 1040. In general, the beam power (or intensity) in the signal channel 1030 is lower compared to the beam power (or intensity) in the LO channel 1040. For example, the coupler 1020 can have a 90:10 split ration, directing 90% of the laser power into the LO channel 1040 and 10% of the laser power in to the signal channel 1030.

The signal channel 1030 includes a phase modulator 1031 and an amplitude modulator 1032 to modulate the laser light with a centered Gaussian distribution having variance $V_A$. The amplitude modulator 1032 can be a time-dependent amplitude modulator. A time-independent intensity modulator 1033 is disposed after the two modulators 1031 and 1032 to reduce the signal intensity such that the number of photons per time bin is sufficiently low (e.g., several to hundreds of photons, depending on the channel loss). A coupler 1034 is connected to the modulator 1033 to couple out a portion (e.g., 10%) of the signal light so as to allow power monitoring. The remaining signal light is then coupled to a ring resonator 1035, which can multiplex the signal light with the local oscillator light (described below). In addition, noise (e.g., white noise, random nose, etc.) may be added to enhance the secure key rate.

The LO channel 1040 includes a time delay 1041, which can delay the LO light by a variable amount through the selection of various delay path lengths. The delay allows for the coupling of signal light and LO light into a single fiber to preserve the phase evolution of the two quantities. The LO channel 1040 also includes a phase modulator 1042 and an amplitude modulator 1043, which can apply random phase and amplitude noise to the LO light so as to improve protocol security. A coupler 1044 is connected to the output of the modulator 1043 to couple out a small ratio of LO light to monitor the power level, while the majority of the LO light propagates through and reaches a ring resonator 1045. The ring resonator 1045 can couple out the LO light and multiplex it with the signal light provided by another ring resonator 1035 in the signal channel 1030. The multiplexed signal, including the signal light and the LO signal, is then transmitted to Bob for demultiplexing and key generation.

Figure 11:
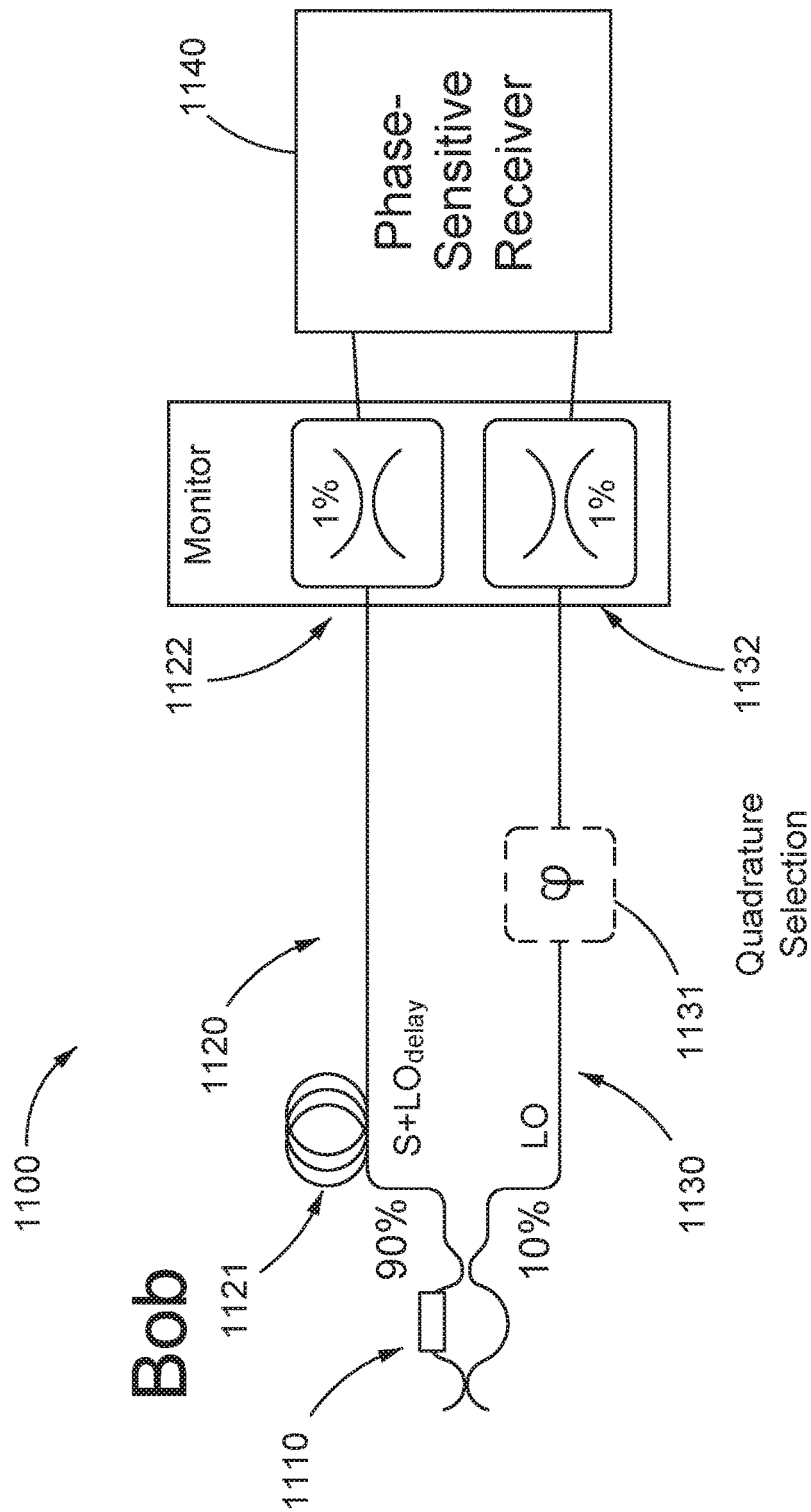
FIG. 11 shows a receiver that can be used in continuous variable QKD.

FIG. 11 shows a schematic of a receiver 1100 that can be used by Bob to receive the signals provided by the transmitter 1000 shown in FIG. 10. The receiver 1100 includes a coupler 1110 to receive the multiplexed signals provided by Alice and direct the received signals into two channels: an S+LO channel 1120 and an LO channel 1130. In generally, a major portion of the total power in the received signals is transmitted into the S+LO channel 1120 (e.g., 70%, 80%, 90% or more), while the LO channel 1130 receives the remaining (e.g., 30%, 20%, 10%, or less).

The S+LO channel 1120 includes a delay line 1121 to delay the received signals by an amount corresponding to the LO delay applied by Alice (e.g., applied by the delay 1041 shown in FIG. 11). A coupler 1122 is disposed in the S+LO channel to couple out a portion of the delayed signals for power monitoring. The LO channel 1130 includes a phase modulator 1131 to apply a phase so as to select the measurement quadrature (i.e., x quadrature or p quadrature). The output from the two channels 1120 and 1130 are then mixed on a phase sensitive detector 1140. The phase-sensitive detector 1140 can be a homodyne detector, which randomly measures between the x and p quadrature, or a heterodyne detector (with no randomness requirement).

Figure 12B:
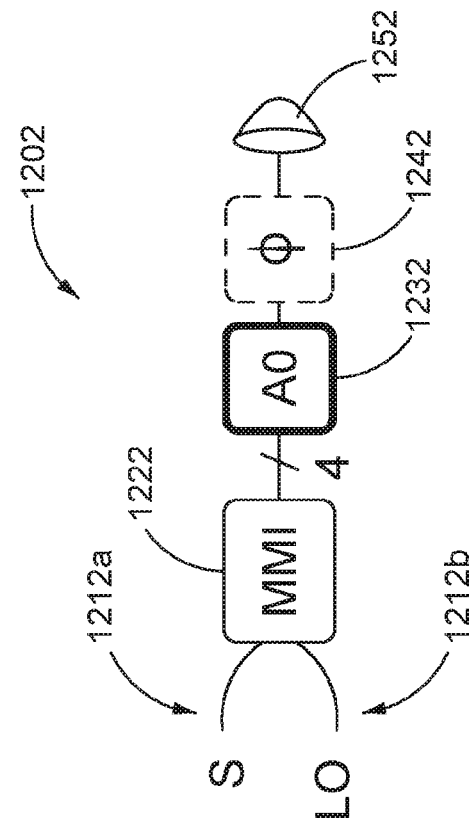
FIGS. 12A and 12B show schematics of homodynes and heterodyne detections systems, respectively, that can be used in the receiver shown in FIG. 11.
Figure 12A:
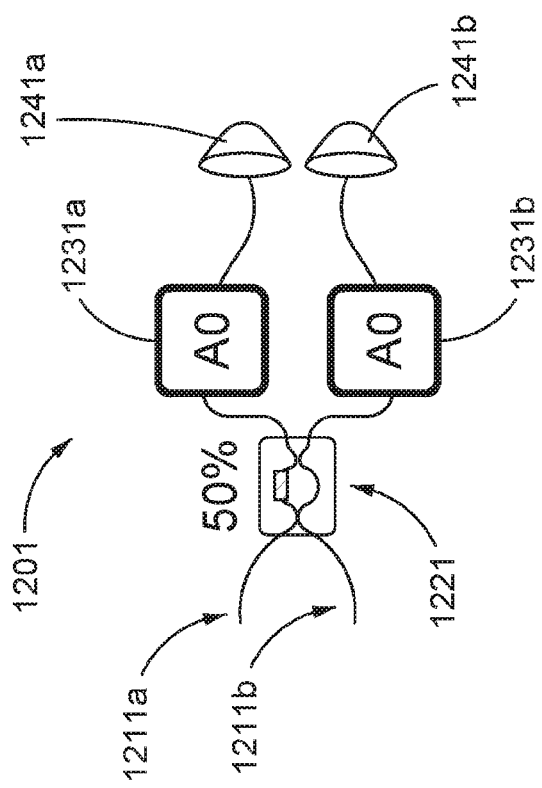

FIGS. 12A and 12B show schematics of a homodyne detection system 1201 and a heterodyne detection system 1202, respectively, both of which can be used in the receiver chip 1100 shown in FIG. 11. The homodyne detection system 1201 includes two receiving ports 1211a and 1211b to receive the outputs from the S+LO channel and LO channel in the receiver shown in FIG. 11. A coupler 1221 (e.g., 50:50 directional coupler) then equally mixes the two signals from the two channels and distributes the mixed signals to two intensity modulators 1231a and 1231b for path balancing. Two detectors 1241a and 1241b are coupled to the two modulators 1231a and 1231b, respectively, for homodyne detection.

The heterodyne detection system 1202 includes two receiving ports 1212a and 1212b to receive the outputs from the S+LO channel and LO channel in the receiver shown in FIG. 11. A multimode interferometer (MMI) 1222 then receives the signals from the two receiving ports 1212a and 1212b and distributes the signal and oscillator levels among four modes evenly and with a π/2 phase difference. An intensity modulator 1232 and a phase modulator 1242 are coupled to the MMI 1222 for corrections to this MMI functionality and achieve optimal measurements. A detector 1252 then carries out the measurement of the modulated signals.

As readily appreciated by those of skill in the art, the components in the apparatus shown in FIGS. 10-12B can be implemented using any of several options to achieve similar functions.

The phase and amplitude modulators (e.g., 1012, 1031, 1032, 1033, 1042, 1043 shown in FIG. 10, 1131 shown in FIG. 11, 1231a and 1231b shown in FIG. 12A, and 1232 and 1242 shown in FIG. 12B) can include modulators based on various mechanisms. In one example, the modulators can use plasma dispersion to achieve modulation. In another example, the modulators can rely on thermal-optical effect to apply modulation. In yet another example, the modulators can introduce modulation to the light pulses via free-carrier absorption through optical pumping. In yet another example, electro-optic effects (e.g., via $\chi^2$ or other parametric processes) can be used for phase and amplitude modulation. In yet another example, graphene-based devices can also be used for modulation.

The couplers (e.g., 1020, 1034, and 1044 shown in FIG. 10, 1110, 1122, and 1132 shown in FIG. 11, and 1221 shown in FIG. 12A) can include evanescent field couplers to receive and distribute incident signals into different beam paths. In another example, the couplers can include MMI couplers. In yet another example, the couplers can include MZIs.

The tunable delays (e.g., 1041 shown in FIG. 11 and 1121 shown in FIG. 11) can be achieved by a network of tunable MZIs capable of routing to different waveguide delays. In addition, a low-loss delay path can be implemented with low-loss adiabatic transitions to waveguide modes with small sidewall overlap.

The detectors (e.g., 1241a and 1241b shown in FIG. 12A, 1252 shown in FIG. 12B) can include various types of detectors. In one example, the detectors include integrated photodiodes that can be integrated into photonic integrated circuits. In another example, the detectors can include photoconductors. In yet another example, the detectors can include single-photon detectors or any other form of detectors known in the art.

Cavity Integrated Quantum Key Distribution

This section describes silicon photonics QKD transmitters based on an integrated ring cavity to increase the secure key rate and also allow for multi-wavelength operation. Quantum key distribution (QKD) protocols can be used to securely generate and distribute random keys between two separated parties, even in the presence of eavesdroppers, by exploiting fundamental features of quantum mechanics. While recent QKD demonstrations can have secure-key rates at Mbps, a large gap still exists between QKD and today's classical telecommunication systems, which operate at rates of 1 Gbps between end users. Bridging this gap can benefit quantum cryptography systems by encrypting most of today's sensitive communications using the one-time pad. QKD systems can also benefit from the use of degrees of freedom such as wavelength. In a wavelength-division multiplexed (WDM) QKD system, parallel QKD systems operating at different wavelength channels can generate secret keys concurrently through a single optical fiber.

Moreover, practical QKD systems may be susceptible to side-channel attacks that rely on imperfections in real-life realizations of QKD systems. Security loopholes include detector time-shift, detector blinding, and Trojan-horse attacks. MDI-QKD architecture as described above can close detector side-channel loopholes by allowing the eavesdropper Eve to have complete control of the receiver system, which now performs Bell state measurements of weak coherent pulses produced by Alice and Bob. The Trojan-horse attack, where Eve launches a bright Trojan light pulse into Alice's transmitter module and learns about the information encoded by Alice's modulators from the reflected Trojan photons, can be prevented by the presence of a watchdog detector along with sufficient optical attenuation.

Figure 13A:
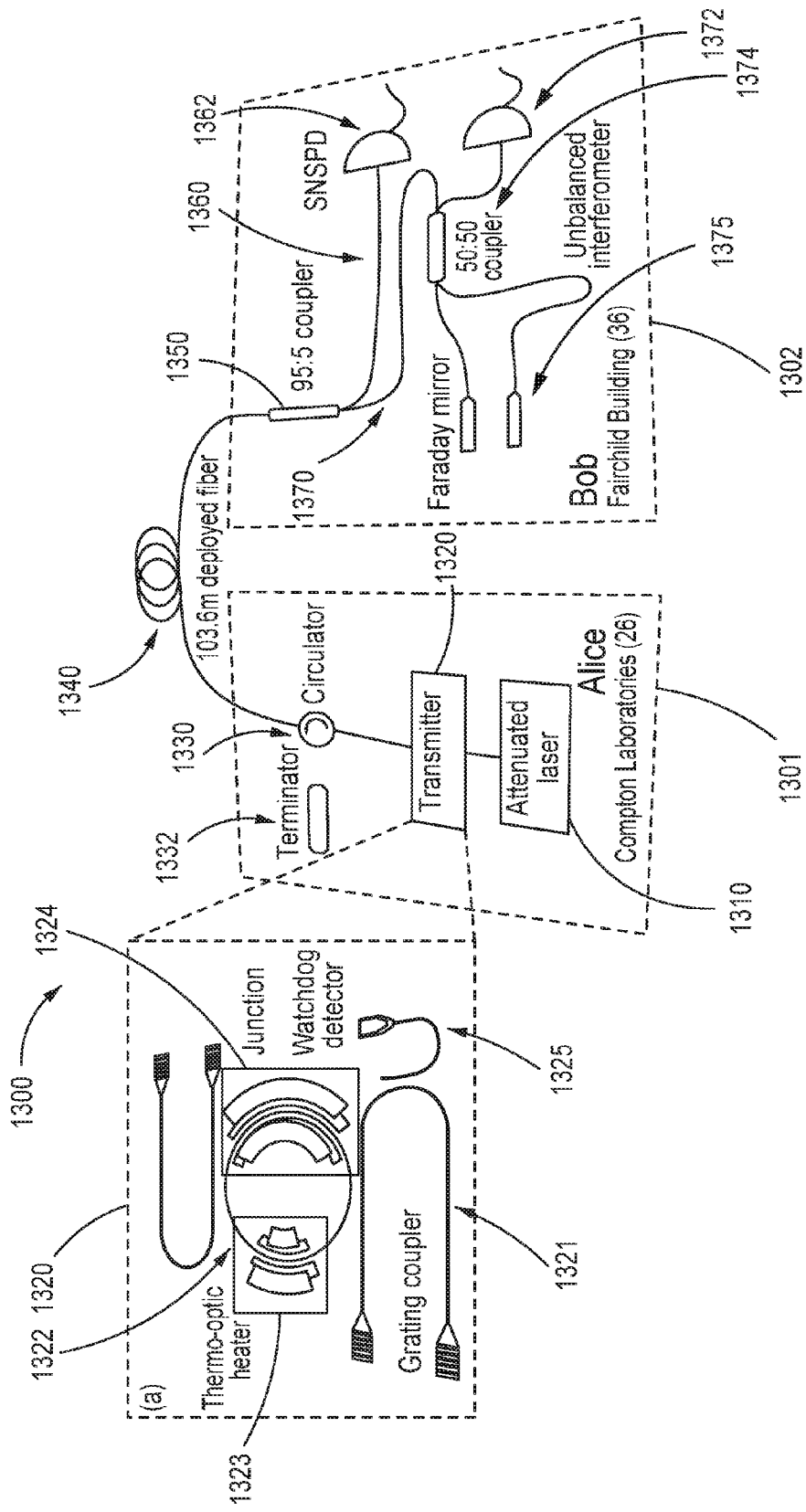
FIG. 13A shows a schematic of a system for cavity-integrated QKD.

FIG. 13 shows a schematic of a QKD system 1300 that uses a cavity-integrated transmitter. The system 1300 includes a transmitting end 1301 and a receiving end 1302. The transmitting end 1310 includes an attenuated laser 1310 to provide light beams or pulses for key generation. The output light from the attenuated laser 1310 is delivered to a transmitter 1320 to generate qubits that can be sent to a receiving end 1302. Along the beam path from the transmitting end 1301 to the receiving end 1302, a circulator 1330 is used to prevent any reflection of laser light from the channel back into the transmitter 1320. A terminator 1332 is used as a dumper to receive the light coupled out by the circulator 1320. The beam path also includes a fiber delay 1340 to control the timing.

The receiving end 1302 includes a coupler 1350 (e.g., a 95:5 directional coupler) to receive signals transmitted from the transmitting end 1302 and split the received signals into two channels (also referred to as two paths): a first channel 1360 and a second channel 1370. The first channel 1360 includes a detector 1362 to measure the received signals. The second channel 1370 includes another coupler 1374 (e.g., a 50:50 directional coupler) to direct a portion of the signals into a Faraday mirror 1375 and another portion of the signals into a detector 1372. The second channel 1370 leads to an unbalanced Michelson interferometer to interfere two light pulses from two adjacent time bins. At the coupler 1374, each light pulse is split into two arms (one short and one long). Each light pulse is also then reflected by the Faraday mirrors 1375. Because originally two light pulses (designated as 1 and 2) are incident on the coupler 1374 and each light pulse is further split into two portions, four light pulses (designated as 1-early, 1-late, 2-early, 2-late) are delivered out of 1374 and propagate towards the detector 1372. There can be interference between the reflected light pulse that has gone through the long arm (1-late) and the reflected light pulse that has gone through the short arm (2-early). This is the interference detection. In some examples, the detections of 1-early and 2-late can be discarded because they may not provide information on Eve's eavesdropping.

The transmitter 1320 includes a ring cavity 1322 light-confining structures that can enhance the effects of refractive index change on the transmission response. A grating coupler 1321 is evanescently coupled to the ring cavity 1322 on one end and coupled to the attenuated laser 1310 on the other end, so as to transmit light from the laser 1310 to the ring cavity 1322. The transmitter 1320 also includes a thermo-optic heater 1323 to red-shift the cavity resonance and a silicon junction 1324 to modulate the input laser light into pulses. A germanium watchdog detector 1325 is used in the transmitter 1320 to prevent Eve from sending Trojan photons into the transmitter.

In operation, light is coupled into the system 1300 via radially-symmetric, A-spaced gratings 1321 with an approximately Gaussian mode profile. Light is then guided to and from the ring cavity 1322 using 500 nm by 220 nm silicon nanowire waveguides clad in 2 µm of silicon dioxide. The near critically-coupled ring cavity 1322 can have a diameter of 30 µm, a free-spectral range (FSR) of 6 nm, and a quality factor of 6279. The transmission through the ring 1322 can be high when the laser wavelength is resonant with the ring, specifically when the ring circumference corresponds to an integer multiple of the guided light wavelength. The resonant frequency of the ring cavity 1322 can be red-shifted using the thermo-optic heater 1323, which can increase the cavity optical path length when the cavity is being heated. Alternatively, blue-shifting the resonant frequency can also be performed.

The receiving end 1302 performs an asymmetric basis choice between the arrival time basis and the interference basis. For each basis choice, Bob can use a WSi SNSPD with 85% quantum efficiency.

Figure 13C:
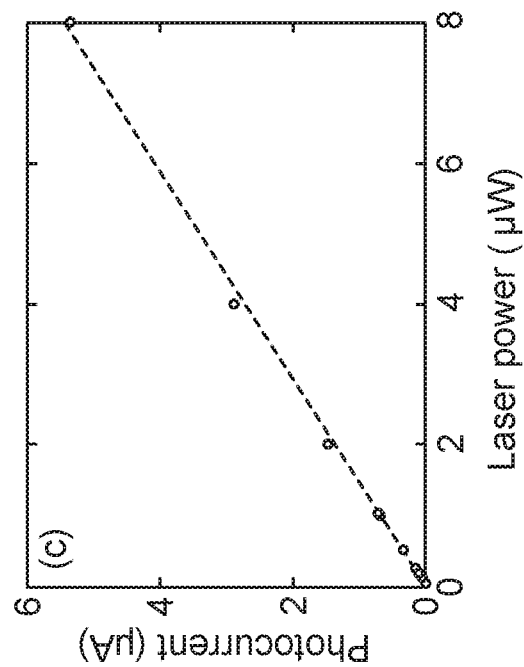
FIG. 13C shows photocurrent responses of detectors that can be used in the system shown in FIG. 13A.
Figure 13B:
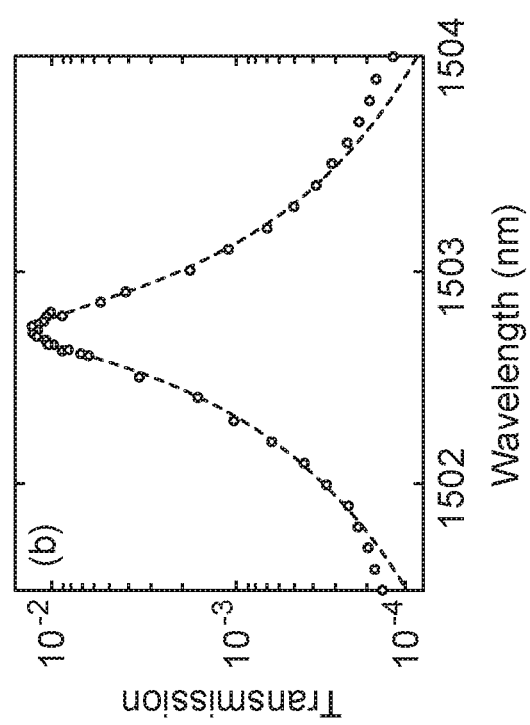
FIG. 13B shows transmission of a ring cavity that can be used in the system shown in FIG. 13A.

FIG. 13B shows the transmission of the ring cavity 1322 at the central wavelength at 1502.72 nm. The solid circles are measured transmission through the ring cavity 1322 and the dashed line is a Lorentzian fit to the cavity transmission. FIG. 13C shows photocurrent responses of the detectors. Solid circles are measured detector's photocurrent response to input laser power and dashed line is a linear fit to the photodiode response.

Figure 14:
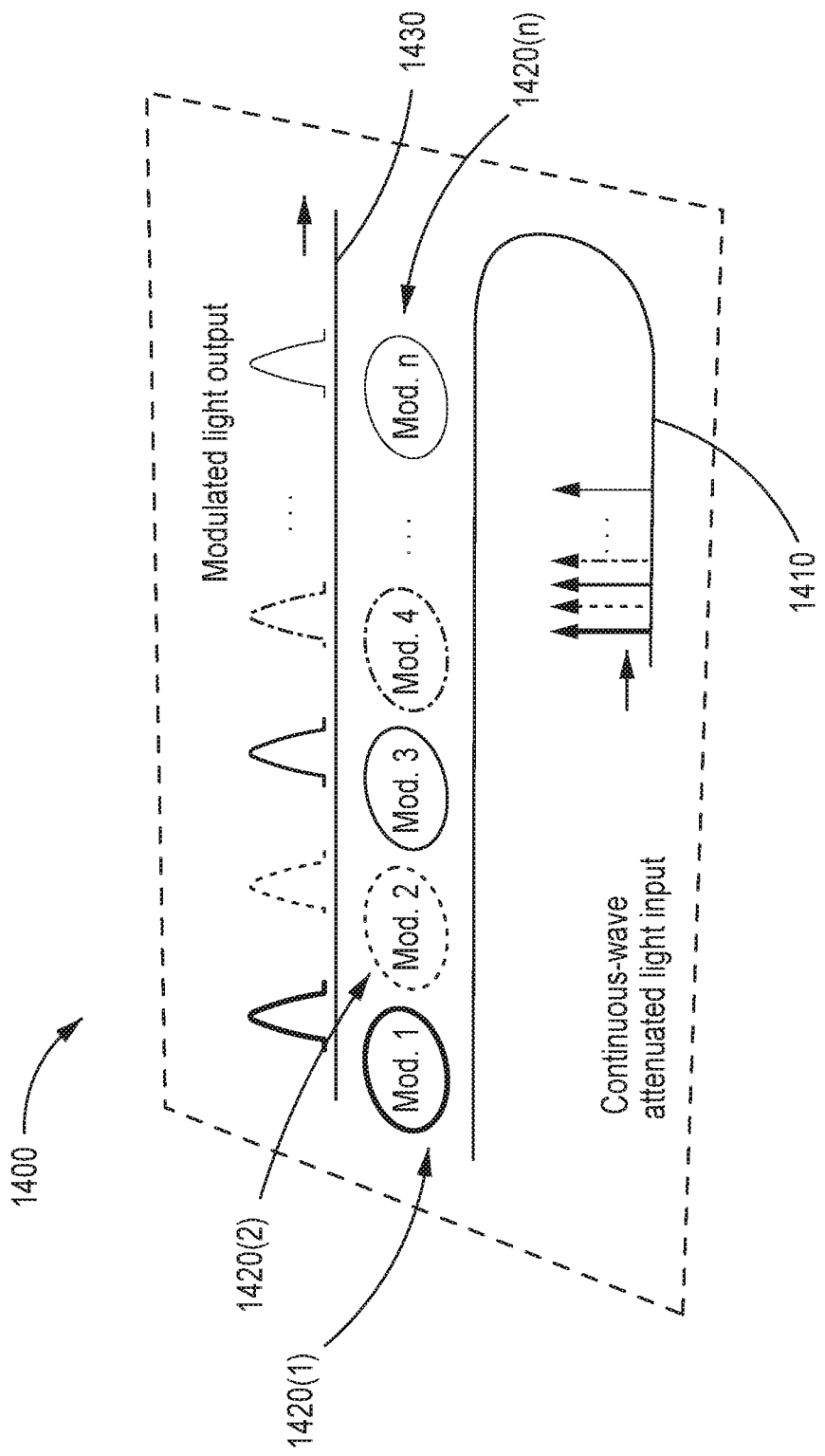
FIG. 14 shows a schematic of a cavity-integrated QKD transmitter for wavelength-division-multiplexing (WDM) operation.

FIG. 14 shows a schematic of a QKD system 1400 for WDM operations. The system includes an input waveguide 1410 to receive light beams including multiple spectral components at different wavelengths. A group of ring cavities 1420(1), 1420(2), . . . , and 1420($n$) are evanescently coupled to the input waveguide 1410. Each ring cavity can have a distinct resonant wavelength and creates qubits at that wavelength. The generated qubits are then coupled to an output waveguide 1430 for delivery to the receiving party. The group of ring cavities 1420 can work in parallel with each other and therefore increase the efficiency of the resulting system 1400.

Characterization of Cavity Integrated Quantum Key Distribution Systems

Modulation depth, which can be defined as the ratio of power between the modulator's on-state and its off-state, can be a metric in quantum cryptography systems, since it relates to the probability of a single photon entering the quantum channel when the modulator is in its off-state. If this photon is detected by Bob's apparatus, it can not only cause an error in Bob's measurement, but can also render Bob's detector inactive for the reset time duration. Modulation in photonic integrated QKD transmitters is typically achieved by producing a refractive index change in the waveguide, and the amount of refractive index change depends strongly on the amount of electro-optic effect that can be provided within the system. A cavity-based QKD transmitter enhances this electro-optic effect by confining the light within a cavity, such that any refractive index change on the cavity is amplified by the number of round trips the light travels around the by the carrier recombination time of the silicon sample (typically on the order of a nanosecond).

The systems 1300 shown in FIG. 13 can be employed to implement the coherent one-way (COW) QKD protocol, where a bit string is encoded in the arrival time of the weak coherent laser pulses modulated by the ring cavity. Furthermore, channel disturbance, which is assumed to be due to Eve, is monitored by measuring the visibility of the interference between two adjacent pulses.

In COW QKD, Alice can randomly prepare the state $|0\rangle = |\alpha\rangle_0 |0\rangle_1$ and $|1\rangle = |0\rangle_0 |\alpha\rangle_1$ to send bits 0 and 1, respectively, where $|\alpha\rangle_i$ represents a laser pulse in time bin i. Alice further prepares decoy state $|d\rangle = |\alpha\rangle_0 |\alpha\rangle_1$ randomly to monitor the phase coherence of two consecutive laser pulses. Bob, on the other hand, uses an asymmetric beam splitter to randomly choose one of the two possible measurement bases: arrival-time or interference. In the arrival-time basis, Bob directly measures the arrival time of the incoming laser pulses and generates a raw bit string. The quantum bit error rate (QBER), denoted by $\hat{Q}$ can be measured without any uncertainty by directly counting the number of bits flipped between Alice's and Bob's raw bit string. In the interference basis, Bob first passes two adjacent pulses through an unbalanced Michelson interferometer before measuring the resulting interference.

The phase of the interferometer is maintained such that Bob measures the destructive port of the interferometer. The visibility of the interference can be measured by comparing detections due to interfering events (two adjacent pulses) and non-interfering events (single pulse). The quantum visibility $V_{key}$, used to generate the secret keys is estimated by bounding $V_{key} \leq \hat{V} = V_{obs}^{-t}$, where $V_{obs}$ is the observed visibility and t is a positive parameter related to the estimation procedure.

On the transmitting end, Alice can use an attenuated laser light at wavelength of 1503.25 nm with a 100 kHz linewidth. To modulate this attenuated light using the ring cavity, Alice can bias the doped silicon junction in a forward bias configuration with a DC voltage of 1.450 V and applies a negative 2 ns square pulse with a peak-to-peak voltage of 0.700 V. The resulting optical pulse has a full width of half maximum (FWHM) of 0.915 ns. The mean photon number of these pulses is kept low at 0.0487 per pulse to avoid saturating Bob's SNSPDs. Alice's modulation, which is performed at a clock rate of R=53.839 MHz, follows the random bit values that were generated beforehand by a random number generator and stored on her disk. In addition, Alice can prepare a decoy state in 1% of the frames by populating both time bins with laser pulses. Alice's prepared states are then sent to Bob via the fiber-optic quantum channel after passing through a circulator, Bob detects the pulses sent by Alice in either the arrival-time basis with a 95% probability or the interference basis with a 5% probability. Photon detection in each basis is performed using a WSi SNSPD with a quantum efficiency of 85% and a timing jitter of about 150 ps. The two detectors, however, differ in their background dark count rates: 200 cps for the arrival-time detector and 1000 cps for the interference detector. Furthermore, to ensure a high interference visibility, the path length difference between the two arms of the unbalanced interferometer is chosen to match the time difference between two adjacent time bins at 9.3 ns.

Moreover, during the transmission period, Alice can also prevent a Trojan-horse attack by monitoring the photocurrent generated by the germanium photodiode to sense any possible counter-propagating light into her transmitter. If Alice detects counter-propagating light, she aborts the QKD protocol, deeming it insecure against Eve's eavesdropping attempts. Alice's watchdog detector has a bandwidth of above 30 GHz and a responsivity of 0.68 A/W. The highest reflectivity of the QKD transmitters is measured to be −41.4 dBm at 1500.4 nm wavelength. Therefore, if Eve were to obtain one or more reflected Trojan photon for every frame of Alice's transmission (with a frame size of 18.5739 ns), Eve would have to send Trojan photons into the transmitter at an average power of at least −40.0 dBm, which would have been detected by Alice's watchdog detector.

Alice and Bob then distill a secret key length 1 from a weakly random bit string of length n for some security parameter E and mean photon number per pulse μ. The secret key length can be bounded by $$l \leq n\left[1 - fh(\hat{Q}) - \hat{Q} - (1-\hat{Q})h\left(\frac{1+\xi(\mu,\hat{V})}{2}\right)\right] - 7\sqrt{n\log_2\frac{1}{\varepsilon}} - \log_2\frac{1}{2\varepsilon^3}, \quad (3)$$

where $h(x)=-x \log_2 (x) - (1-x) \log_2 (1-x)$ is the binary Shannon entropy, and $\xi(\mu, \hat{V}) = (2\hat{V}-1)e^{-\mu} - 2\sqrt{\hat{V}(1-\hat{V})(1-e^{-2\mu})}$. Here, $fh(\hat{Q})$ is the number of bits revealed during error correction. In the asymptotic limit, this number approaches the Shannon limit: f→1. The key rate is estimated by taking f=1.2. The QKD system is based on a universally composable security framework, and it is deemed $\xi_{qkd}$-secure when: (a) the probability of Alice and Bob having different secret keys is $\xi_{cor}$ (b) the probability of their secret keys being distinguishable from ideal secret keys is $\xi_{sec}$, and (c) the failure probability of the overall QKD protocol is $\xi_{qkd} \geq \xi_{cor} | \xi_{sec}$. In estimating the secret key rate, a tight failure probability $\xi_{qkd} = 4 \times 10^{-9}$ with $\xi_{cor} = \xi_{sec} = E = 10^{-9}$ is adopted.

Figure 15:
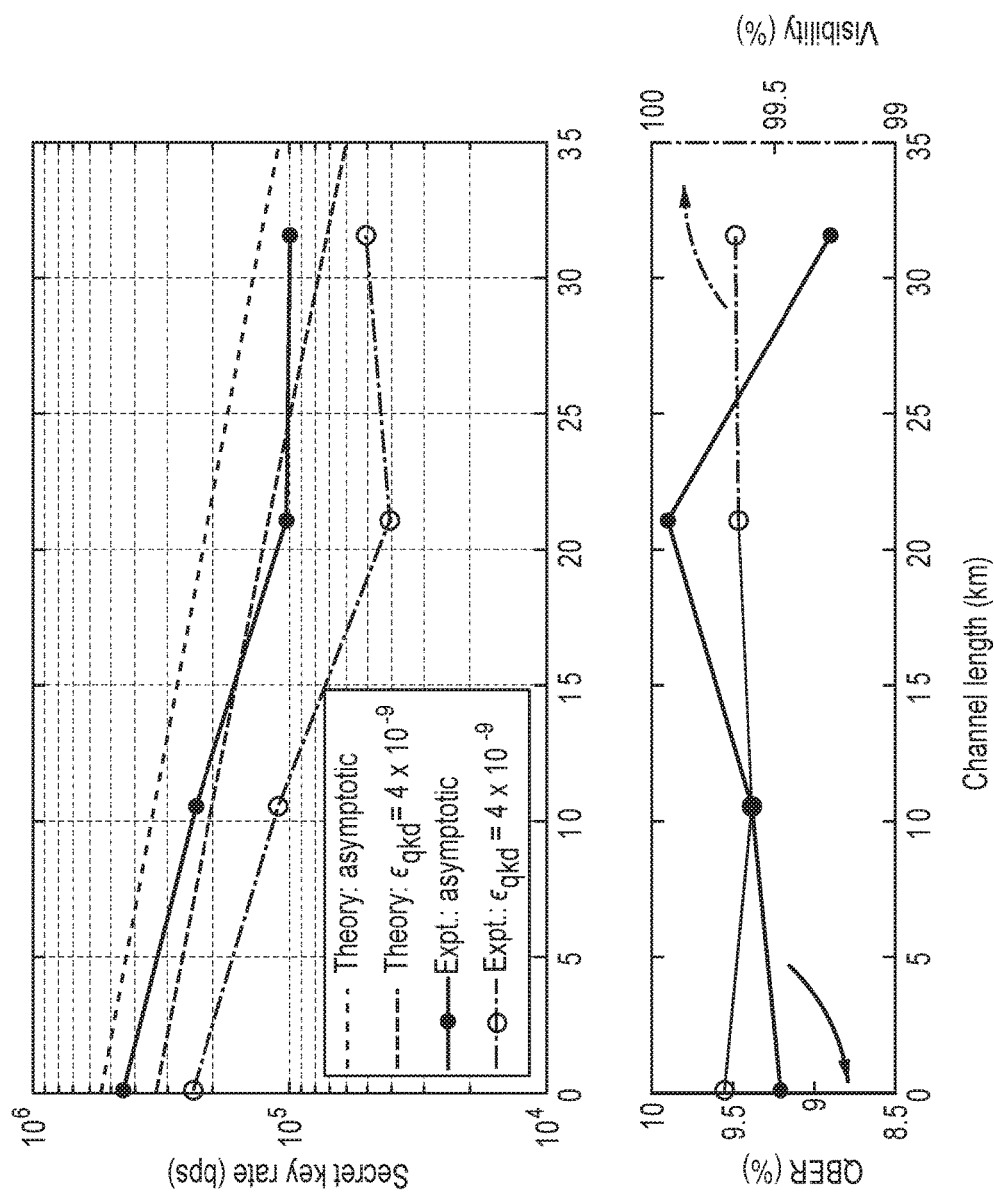
FIG. 15 shows experimental results of a cavity-integrated QKD system.

FIG. 15 shows the secret key rates (SKRs) of the QKD system, along with the measured QBER $\hat{Q}$ and visibility $\hat{V}$. The top panel shows the final experimental SKR results plotted against fiber-optic channel length. The solid circles are the calculated SKR in the asymptotic regime, while the empty circles are the calculated SKR using the composable security framework with $\varepsilon_{qkd} = 4 \times 10^{-9}$. The dashed lines are the theoretical plots for the two aforementioned SKR calculation frameworks, assuming 0.2 dB/km attenuation over the fiber-optic quantum channel. The bottom panel shows the QBER, $\hat{Q}$ (solid red circles), and visibility, $\hat{V}$ (empty circles), measured at each channel length. $\hat{V}$ provides a lower bound of the quantum visibility $V_{key}$.

The SKRs are calculated not only in the composable security framework, but also in the asymptotic limit to compare the performance of the physical QKD system to the performance of the system if Alice and Bob had access to an unlimited amount of resources. Furthermore, to simulate the performance of the system when operating with quantum channels longer than current channel, fiber spools of lengths up to 31.5 km can be added in increments of 10.5 km. The mean photon number is maintained at 0.0487 per pulse at all distances, and the highest SKR is 236.5 kbps at a distance of 103.6 m.

Two improvements can be made to further increase the SKR of current QKD system. First, the QKD system may be limited by the maximum count rate of the detectors which is about $5 \times 10^6$ cps for each detector channel. Increasing the maximum count rate of the arrival-time detector by using two or more detectors in this basis can increase both the pulse mean photon number μ and the repetition rate R of the system. These improvements can lead to an increase in the rate of detections in the arrival-time basis that can, therefore, lead to an improvement in the SKR.

Second, increasing the extinction ratio of the cavity modulator can lead to a reduction in the number of clicks outside of the desired time bins. To increase the extinction ratio, two cavities can be placed next to each other within a diameter (30 μm for the ring cavity) apart to carve a single light pulse. Because the cavities are lithographically-defined, the two cavities can have almost identical spectral and modulation properties. This can be similar in practice to using two intensity modulators in series to achieve a higher modulation depth-only now with lithographically-defined modulators. Since Bob's arrival time detector is close to being saturated in the characterization, such an improvement in extinction ratio can reduce the QBER, Q and increase the system's repetition rate.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for distributing a quantum key, the apparatus comprising:
   an input waveguide;
   a first ring resonator, evanescently coupled to the input waveguide, to receive a first pulse of light via the input waveguide;
   a second ring resonator, evanescently coupled to the input waveguide, to receive a second pulse of light via the input waveguide;
   an output waveguide, evanescently coupled to the first ring resonator and the second ring resonator, to receive the first pulse of light from the first ring resonator and the second pulse of light from the second ring resonator; and
   at least one modulator, operably coupled to at least one of the first ring resonator, the second ring resonator, and the output waveguide, to delay at least one of the first pulse of light or the second pulse of light so as to generate a photonic qubit in an X-basis or a Z-basis,
   wherein the first ring resonator is configured to emit a third pulse of light and the at least one modulator is configured to delay the third pulse of light with respect to the first pulse of light so as to form a $|+\rangle$ state in the X-basis.

2. The apparatus of claim 1, wherein the at least one modulator is configured to delay third pulse of light with respect to the first pulse of light by a period equal to an integer multiple of an oscillation period of a carrier of the first pulse of light.

3. The apparatus of claim 1, wherein the at least one modulator is configured to delay the first pulse of light with respect to the second pulse of light so as to form the photonic qubit in a $|-\rangle$ state in the X-basis.

4. The apparatus of claim 1, wherein the at least one modulator is configured to delay the first pulse of light with respect to the second pulse of light by a period selected to create a $\pi$ phase difference between the first pulse of light and the second pulse of light.

5. The apparatus of claim 1, wherein the at least one modulator is configured to delay the first pulse so as to form the photonic qubit in a state in the Z-basis.

6. The apparatus of claim 1, wherein the at least one modulator comprises a phase shifter, operably coupled to the output waveguide, to vary a phase difference between the first pulse of light and the second pulse of light.

7. The apparatus of claim 1, wherein the output waveguide comprises:
   a receiving section;
   a propagation section to guide the first light received by the receiving section; and
   a loop section having at least one segment evanescently coupled to the propagation section so as to couple at least a portion of the first pulse of light back to the propagation section,
   wherein at least one of the first ring resonator and the second ring resonator is evanescently coupled to the propagation section of the input waveguide.

8. The apparatus of claim 1, further comprising:
   a detector, optically coupled to the input waveguide, to monitor an intensity of the first pulse of light.

9. The apparatus of claim 1, further comprising:
a phase randomized light source, in optical communication with the input waveguide, to provide the first pulse of light and the second pulse of light.

10. The apparatus of claim 1, further comprising:
an attenuator, operably coupled to the output waveguide, to attenuate an intensity of at least one of the first pulse of light and the second pulse of light so as to create a decoy state.

11. The apparatus of claim 1, further comprising:
a phase shifter, operably coupled to the output waveguide between the first ring resonator module and the second resonator module, to apply a phase shift to the second pulse of light.

12. An apparatus for distributing a quantum key, the apparatus comprising:
an input waveguide;
a first ring resonator, evanescently coupled to the input waveguide, to receive a first pulse of light via the input waveguide;
a second ring resonator, evanescently coupled to the input waveguide, to receive a second pulse of light via the input waveguide;
an output waveguide, evanescently coupled to the first ring resonator and the second ring resonator, to receive the first pulse of light from the first ring resonator and the second pulse of light from the second ring resonator;
at least one modulator, operably coupled to at least one of the first ring resonator, the second ring resonator, and the output waveguide, to delay at least one of the first pulse of light or the second pulse of light so as to generate a photonic qubit in an X-basis or a Z-basis; and
a photonic integrated receiver to detect the photonic qubit, wherein the photonic integrated receiver comprises:
a substrate;
a coupler fabricated in the substrate and comprising:
a first input waveguide to receive qubits provided by a first party;
a second input waveguide to receive qubits provided by a second party;
a first output waveguide; and
a second output waveguide;
a first detector coupled to the first output waveguide; and
a second detector coupled to the second output waveguide.

13. A method of distributing a quantum key using a transmitter comprising an input waveguide, a first ring resonator evanescently coupled to the input waveguide, a second ring resonator evanescently coupled to the input waveguide, and an output waveguide evanescently coupled to the first ring resonator and the second ring resonator, the method comprising:
selecting one of an X-basis and a Z-basis for distributing the quantum key;
in response to selection of the Z-basis, performing at least one of:
delaying a first pulse of light propagating in the first ring resonator to create the quantum key in a |0⟩ state in the Z-basis; and
delaying the first pulse of light propagating in the first ring resonator to create the quantum key in a |1⟩ state in the Z-basis; and
in response to selection of the X-basis, performing at least one of:
delaying the first pulse of light propagating in the first ring resonator with respect to a second pulse of light propagating in at least one of the first ring resonator or the second ring resonator to constructively interfere the first pulse of light with the second pulse of light so as to create the quantum key in an |+⟩ state in the Z-basis; and
delaying the first pulse of light propagating in the first ring resonator with respect to the second pulse of light propagating in at least one of the first ring resonator or the second ring resonator to destructively interfere the first pulse of light with the second pulse of light so as to create the quantum key in an |−⟩ state in the Z-basis.

14. The method of claim 13, wherein selecting one of the Z-basis and the X-basis comprises randomly selecting one of the Z-basis and the X-basis.

15. The method of claim 13, wherein modulating the first ring resonator comprises at least one of thermally modulating or electro-optically modulating the first ring resonator.

16. The method of claim 13, further comprising:
propagating the first pulse of light in a propagation section of the output waveguide;
propagating the first pulse of light through at least one of the first ring resonator and the second ring resonator evanescently coupled to the propagation section of the output waveguide; and
coupling at least a portion of the first pulse of light back to the propagation section of the output waveguide.

17. The method of claim 13, wherein delaying the first pulse of light propagating in the first ring resonator comprises delaying a phase randomized attenuated laser pulse propagating in the first ring resonator.

18. The method of claim 13, further comprising:
attenuating the quantum key to create a decoy state.

19. The method of claim 13, wherein delaying the first pulse of light propagating in the first ring resonator with respect to a second pulse of light propagating in the second ring resonator comprises applying a $\pi$-phase shift to the second pulse of light with respect to the first pulse of light.

20. An apparatus for measurement-device-independent quantum key distribution, the apparatus comprising:
an input waveguide to guide an input pulse of light;
an output waveguide comprising:
a receiving section, evanescently coupled to the input waveguide, to receive the input pulse of light;
a propagation section to guide the input pulse of light received by the input section; and
a loop section having at least one segment evanescently coupled to the propagation section so as to couple at least a portion of the input pulse of light back to the propagation section; and
a first ring resonator evanescently coupled to the propagation section of the output waveguide;
a first modulator, operably coupled to the first ring resonator, to delay a first pulse of light propagating in the first ring resonator;
a second ring resonator evanescently coupled to the propagation section of the output waveguide; and
a second modulator operably coupled to the second ring resonator and having a first modulation mode and a second modulation mode,
wherein, in the first modulation mode, the second modulator delays a second pulse of light propagating in the second ring resonator so as to cause the first pulse of light to constructively interfere with the second pulse of light and, in the second modulation mode, the second modulator delays the second pulse of light so as to cause the first pulse of light to destructively interfere with the second pulse of light.

\* \* \* \* \*